United States Patent
Paquelet et al.

(10) Patent No.: US 10,686,488 B2
(45) Date of Patent: Jun. 16, 2020

(54) METHOD FOR DEMODULATING A RECEIVED SIGNAL, CORRESPONDING COMPUTER PROGRAM AND DEVICE

(71) Applicant: B-COM, Cesson Sevigne (FR)

(72) Inventors: Stephane Paquelet, Rennes (FR); Patrick Savelli, Rennes (FR)

(73) Assignee: B-COM, Cesson Sevigne (FR)

( * ) Notice: Subject to any disclaimer, the term of this patent is extended or adjusted under 35 U.S.C. 154(b) by 0 days.

(21) Appl. No.: 16/307,059

(22) PCT Filed: May 16, 2017

(86) PCT No.: PCT/EP2017/061758
§ 371 (c)(1),
(2) Date: Dec. 4, 2018

(87) PCT Pub. No.: WO2017/211552
PCT Pub. Date: Dec. 14, 2017

(65) Prior Publication Data
US 2019/0149187 A1  May 16, 2019

(30) Foreign Application Priority Data

Jun. 9, 2016 (FR) .................................... 16 55322

(51) Int. Cl.
*H04B 1/69* (2011.01)
*H04L 27/10* (2006.01)
*H04L 27/14* (2006.01)

(52) U.S. Cl.
CPC ............. *H04B 1/69* (2013.01); *H04L 27/103* (2013.01); *H04L 27/14* (2013.01); *H04B 2001/6912* (2013.01)

(58) Field of Classification Search
CPC .................. H04L 27/103; H04L 27/14; H04B 2001/6912; H04B 1/69
See application file for complete search history.

(56) References Cited

U.S. PATENT DOCUMENTS 7,245,930 B1    7/2007 Vishwanath et al.

FOREIGN PATENT DOCUMENTS

| CN | 104869088 A | 8/2015 |
| EP | 2449690 A1 | 5/2012 |

(Continued)

OTHER PUBLICATIONS

"3rd Generation Partnership Project; Technical Specification Group GSM/EDGE Radio Access Network; Radio transmission and reception (Release 8)." 3GPP TS 45.005 V8.8.0. Mar. 2010.

(Continued)

*Primary Examiner* — Sophia Vlahos
(74) *Attorney, Agent, or Firm* — David D. Brush; Westman, Champlin & Koehler, P.A.

(57) ABSTRACT

A method for demodulating a received signal resulting from the modulation of a basic chirp signal including estimating of a symbol carried by the received signal, implementing the following sub-steps: determining N decision components from the received signal and from a reference chirp signal obtained by modulating the basic chirp signal by a reference symbol corresponding to a symbol of rank r, a decision component of index I, denoted as a component $D_I$, being a function of a term, the phase of which depends quadratically on I, with I being an integer from 0 to N−1; and deciding the rank $\hat{k}$ of the symbol carried by the received signal, from the decision component, of index k, denoted as a component $D_k$, having an extremum value among the N decision components.

12 Claims, 4 Drawing Sheets

(56) References Cited

FOREIGN PATENT DOCUMENTS

| EP | 2763321 A1 | 8/2014 |
| EP | 2975814 A1 | 1/2016 |
| WO | 2011000936 A1 | 1/2011 |

OTHER PUBLICATIONS

English Translation of Written Opinion of the International Searching Authority dated Jul. 14, 2017 for corresponding International Application No. PCT/EP2017/061758, filed May 16, 2017.
International Search Report dated Jul. 5, 2018 for corresponding International Application No. PCT/EP2017/061758, filed May 16, 2017.
Written Opinion of the International Searching Authority dated Jul. 5, 2018 for corresponding International Application No. PCT/EP2017/061758, filed May 16, 2017.
English translation of the French Search Report and Written Opinion dated Feb. 27, 2017 for corresponding French Application No. FR1655322, filed Jun. 9, 2016.
Chinese Office Action and English translation dated Mar. 25, 2020 for corresponding Chinese Application No. 201780035749.1.

METHOD FOR DEMODULATING A RECEIVED SIGNAL, CORRESPONDING COMPUTER PROGRAM AND DEVICE

CROSS-REFERENCE TO RELATED APPLICATIONS

This Application is a Section 371 National Stage Application of International Application No. PCT/EP2017/061758, filed May 16, 2017, which is incorporated by reference in its entirety and published as WO 2017/211552 A1 on Dec. 14, 2017, not in English.

1 TECHNICAL FIELD

The field of the invention is that of the transmission of data through a radio frequency link based on the modulation of a waveform called a "chirp" as used in the LoRa® technology.

More specifically, the invention relates to a method for demodulating such a waveform that has improved performance over existing techniques as well as comparable complexity of implementation.

As the LoRa® technology is dedicated to low-consumption transmission by connected things, the invention has applications in all fields of personal and professional life where connected things are present, especially but not exclusively in the fields of health, sports, home applications (security, electrical and electronic appliances, etc.), the tracking of things, etc

2 TECHNOLOGICAL BACKGROUND

Connected things, which are presented as being "the Internet third revolution" are now becoming increasingly prevalent in all fields of daily and corporate life. Most of these things are intended for the production of data through their integrated sensors in order to give value-added services to their owners.

The very applications concerned are such that these connected things are mainly nomadic things. In particular, they should be capable of transmitting data produced regularly or at request to a distant user.

To this end, long-range radio transmission of the mobile cellular radio type (2G/3G/4G, etc.) has been a technology of choice. This technology has indeed made it possible to benefit from efficient network coverage in most countries.

However, the nomadic aspect of these things is often accompanied a need for energy autonomy. Now, even when based on the most energy-efficient mobile cellular radio technology, these connected things presently show consumption levels that rule out large-scale deployment at reasonable costs.

Faced with the problems of consumption by radio links for such nomadic applications, novel low-consumption radio technologies and low-bit-rate radio technologies, specifically dedicated to the "Internet of Things" networks, i.e. radio technologies for networks known as LPWAN (low-power wide-area networks), are now appearing.

In this context, two types of technologies can be distinguished:
on the one hand, there are proprietary technologies such as for example the technology of the company Sigfox®, or the LoRa® technique or again the technology of the firm Qowisio®. In practice, these non-standardized technologies all rely on the use of the "industrial, scientific and medical" (or ISM) frequency band and on the regulations associated with its use. The value of these technologies is that they are already available and enable the rapid deployment of networks on the basis of limited investment. In addition, they enable the development of connected things that are highly energy efficient and at low cost;
on the other hand, there are several technologies promoted by standardizing organizations. For example, we can cite three technologies that are being standardized with the 3GPP ($3^{rd}$ Generation Partnership Project): NB-IoT (Narrow Band-Internet of Things), LTE MTC (Long Term Evolution-Machine Type Communication) and EC-GPRS (Extended Coverage-General Packet Radio Service). However, such solutions are not as yet entirely specified and will furthermore rely on licensed frequency bands.

In this context, it can be seen that proprietary technologies based on the use of the ISM band are seen as solutions of choice in the short term and one or more of them can then actually become prevalent as the solution to be used.

For example, the patent document EP 2 449 690 B1 describes a technique of information transmission based on the modulation of a basic chirp signal on which the LoRa® technology is based.

Now, certain operators such as Bouygues® or Orange® in France, have already taken to the LoRa®technology to deploy their networks dedicated to connected things. However, initial feedback indicates unsatisfactory user experience related to low performance of the radio link in real conditions.

There is therefore a need to improve the performance of a receiver implementing the LoRa® technology in real conditions, and especially in the face of a radio mobile propagation channel that presents fading phenomena.

There is also a need that such an improvement should not lead to excess energy consumption by the receiver and should therefore not penalize the autonomy of the connected thing embedding such a receiver.

3 SUMMARY

In one embodiment of the invention, a method is proposed for demodulating a received signal. This received signal results from the modulation of a basic chirp signal, the instantaneous frequency of which varies linearly between a first instantaneous frequency f0 and a second instantaneous frequency f1 for a symbol time Ts, and from the transmission of the modulated chirp signal in a transmission channel. The modulation corresponds, for a symbol of rank s of a constellation of N symbols, s being an integer from 0 to N−1, to a circular permutation of the pattern of variation of said instantaneous frequency on the symbol time Ts, obtained by a time shift of s times an elementary time duration Tc, such that N*Tc=Ts.

Such a method comprises a step of estimation of a symbol carried by the received signal, implementing the following sub-steps:
determining N decision components from the received signal and a reference chirp signal obtained by modulating the basic chirp signal by a reference symbol corresponding to a symbol of rank r in the constellation, a decision component of index I, denoted as a component $D_I$, being a function of a term, the phase of which depends quadratically on I, with I being an integer from 0 to N−1;
deciding the rank $\hat{k}$ of the symbol carried by the received signal, from the decision component of index k, denoted as a component $D_k$, having an extremum value among the N decision components.

Thus, the invention proposes a novel and inventive solution to enabling the estimation of a symbol carried by a received signal resulting from the modulation of a basic chirp signal having a linear variation of its instantaneous frequency or equivalently having a square variation of its instantaneous phase.

To this end, the method claimed proposes to take account of this square variation of the instantaneous phase of the received signal in order to implement an optimal receiver to decide the rank of the received symbol.

The reception performance values are thus improved while at the same time preserving complexity comparable to that of the prior art receivers.

According to one embodiment, the step for estimating a symbol furthermore comprises the following steps, for N samples of the received signal and for N samples of the reference chirp signal, taken at the same multiple instants of Tc:

conjugating the N samples of the reference chirp signal, respectively the N samples of the received signal, delivering N samples of a conjugate chirp signal;

multiplying, term by term, the N samples of the conjugate chirp signal by the N samples of the received signal, respectively of the reference chirp signal, delivering N samples of a multiplied signal;

forward or inverse Fourier transformation of the multiplied signal, delivering N samples $Y_l$ of a transformed signal with l being an integer from 0 to N−1;

and the component $D_k$ is furthermore a function of a term proportional to an amplitude of the sample of index k, $Y_k$, among the N samples $Y_l$ of the transformed signal, as well as of the phase of the sample $Y_k$.

Thus, the claimed method proposes to take account of the full information (i.e. amplitude and phase) contained in the samples of the signals output from the forward or inverse Fourier transform and not operate solely on the basis of the modulus of these samples as is done in the prior art. The performance values of reception are thus improved while, at the same time, comparable complexity is maintained.

According to one embodiment, the component $D_k$ is furthermore a function of a sub-set of N' samples $Y_n$ among the N samples $Y_l$ of the transformed signal with n being different from σk, with N'≤N, and with σ being a parameter belonging to {−1,1}.

Thus, the claimed method makes it possible to take account of the dispersion of the channel and the inter-symbol interference that results therefrom to decide the rank of the received symbol, thereby improving the reception performance in the presence of a transmission channel having multiple paths.

According to one embodiment, the method comprises a step (E45) for obtaining N channel coefficients and a sample of index n of the sub-set of samples $Y_n$ is weighted by a coupling coefficient proportional to the channel coefficient $H_{\sigma k-n[N]}$ depending on the difference between the indices σk and n, with σ being a parameter belonging to {−1,1}, and to a term, the argument of which depends quadratically on the index k. The term proportional to an amplitude of the sample $Y_k$ is a channel coefficient $H_0$ independent of k.

Thus, the terms weighting the samples $Y_n$ have a component depending solely on the difference between the indices of these samples considered at output of the Fourier transform. Indeed, the invariance in time of the impulse response of the channel leads to terms representing the inter-symbol interference depending solely on the difference between the indices of the considered samples of the signal.

However, the square variation of the phase of the received signal makes it necessary that the coupling between samples should not be invariant in time for a given difference between indices of samples considered.

Thus, taking these two effects into account in the very structure of a considered component $D_k$ in order to estimate the received symbol makes it possible to carry out reception with improved performance in the presence of a transmission channel having multiple paths while enabling work in the frequency domain, i.e. in working on the output samples from a Fourier transform.

According to different embodiments, the component $D_k$ is a function of a term proportional to:

the real part of the sum $$\sum_{n=1}^{N} Y_{N-n}^* e^{2j\pi \frac{m}{N}} e^{-2j\pi \frac{k(\sigma k-n)}{N}} H_{\sigma k-n[N]} S_k,$$

or of the conjugate complex of the sum, when the Fourier transformation is a forward Fourier transform and when the conjugate chirp signal corresponds to the conjugation of the reference chirp signal; or the real part of the sum $$\sum_{n=0}^{N-1} Y_n^* e^{2j\pi \frac{m}{N}} e^{-2j\pi \frac{k(\sigma k-n)}{N}} H_{\sigma k-n[N]} S_k,$$

or of the conjugate complex of the sum when the Fourier transformation is a reverse Fourier transform and when the conjugate chirp signal corresponds to the conjugation of the reference chirp signal; or the real part of the sum $$\sum_{n=0}^{N-1} Y_n^* e^{-2j\pi \frac{m}{N}} e^{2j\pi \frac{k(\sigma k-n)}{N}} H_{\sigma k-n[N]}^* S_k^*,$$

or of the conjugate complex of the sum, when the Fourier transformation is a forward Fourier transform and when the conjugate chirp signal corresponds to the conjugation of the received signal; or the real part of the sum $$\sum_{n=0}^{N} Y_{N-n}^* e^{-2j\pi \frac{m}{N}} e^{2j\pi \frac{k(\sigma k-n)}{N}} H_{\sigma k-n[N]}^* S_k^*,$$

or of the conjugate complex of the sum when the Fourier transformation is a reverse Fourier transform and when the conjugate chirp signal corresponds to the conjugation of the received signal;

with $$S_k = (-1)^k e^{j\pi\sigma \frac{k^2}{N}}$$

and with σ being a parameter belonging to {−1,1}.

Thus, taking account in analytical form, i.e. in the very structure of the received-signal estimating component, of the waveform of the signal considered, for example the square variation of its instantaneous phase, enables simple and efficient implementation of the optimal receiver in terms of maximum likelihood in a multipath transmission channel in the frequency domain, i.e. in working on the samples of the signals at output of a forward or inverse Fourier transform.

Besides, in one variant, only N' channel coefficients are taken into account among the N possible coefficients, thereby simplifying the processing operations embedded in the receiver.

According to one embodiment, the channel coefficients $H_{\sigma k - n[N]}$ are null for n different from σk.

Thus, the claimed method makes it possible to implement the optimal receiver in terms of maximum likelihood in the frequency domain i.e. in working on the samples at output of the Fourier transform in the presence of a channel that is reduced to an AWGN (additive white Gaussian noise) channel which therefore does not introduce any inter-symbol interference. The performance of the receiver is thus improved and shows a criterion of optimality in an AWGN channel for a minimum excess cost of computation.

According to one embodiment, the step for obtaining furthermore comprises an estimation of the channel coefficients from the N samples $Y_n$ of the transformed signal and from at least one pre-determined symbol $k_i$.

Thus, the claimed method makes it possible to estimate the parameters needed to take account of the transmission channel in order to implement an optimal receiver for the estimation of the received symbols in working in the frequency domain, i.e. in working on the samples output from the Fourier transform. Besides, taking account, in analytical form, of the waveform of the signal considered, for example the square variation of its instantaneous phase, means that it is necessary to estimate only the part that is invariant in time of the terms generating inter-symbol interference, i.e. the part that depends only on the difference between the indices of the samples considered, thereby leading to an efficient implementation of the step for estimating parameters that represent the impact of the transmission channel, and therefore of the receiver.

According to one embodiment, with the estimated channel coefficients forming a vector $$\hat{H} = \begin{bmatrix} \hat{H}_0 \\ \hat{H}_1 \\ \vdots \\ \hat{H}_{N-1} \end{bmatrix},$$

the estimation of the coefficients being done on the basis of Ns received symbols, $k_i$ designating the rank of the i-th of said Ns symbols in the constellation of N symbols, $r_i$ designating the rank of a reference symbol used during the reception of said i-th symbol, $Y_l^{(i)}$ designating N samples of said transformed signal obtained during the reception of said i-th symbol, the estimated vector $\underline{\hat{H}}$ of is expressed as $$\hat{\underline{H}} = \frac{1}{N_s} \sum_{i=0}^{N_s-1} \underline{Y'}^{(i)}$$

with $$\underline{Y'}^{(i)} = \frac{1}{N} S_{k_i - r_i[N]}^* \begin{bmatrix} e^{+2j\pi \frac{r_i(0-\sigma_i(k_i-r_i))}{N}} e^{2j\pi \frac{(k_i-r_i)\cdot 0}{N}} Y_{0-\sigma_i(k_i-r_i)[N]}^{(i)} \\ e^{+2j\pi \frac{r_i(1-\sigma_i(k_i-r_i))}{N}} e^{2j\pi \frac{(k_i-r_i)\cdot 1}{N}} Y_{1-\sigma_i(k_i-r_i)[N]}^{(i)} \\ \vdots \\ e^{+2j\pi \frac{r_i(N-1-\sigma_i(k_i-r_i))}{N}} e^{2j\pi \frac{(k_i-r_i)\cdot(N-1)}{N}} Y_{N-1-\sigma_i(k_i-r_i)[N]}^{(i)} \end{bmatrix}$$

when the Fourier transformation corresponds to a forward Fourier transform and when the conjugate chirp signal corresponds to the conjugation of the reference chirp signal; or $$\underline{Y'}^{(i)} = S_{k_i - r_i[N]}^* \begin{bmatrix} e^{-2j\pi \frac{r_i(\sigma_i(k_i-r_i)-0)}{N}} e^{2j\pi \frac{(k_i-r_i)\cdot 0}{N}} Y_{\sigma_i(k_i-r_i)-0[N]}^{(i)} \\ e^{-2j\pi \frac{r_i(\sigma_i(k_i-r_i)-1)}{N}} e^{2j\pi \frac{(k_i-r_i)\cdot 1}{N}} Y_{\sigma_i(k_i-r_i)-1[N]}^{(i)} \\ \vdots \\ e^{-2j\pi \frac{r_i(\sigma_i(k_i-r_i)-N+1)}{N}} e^{2j\pi \frac{(k_i-r_i)\cdot(N-1)}{N}} Y_{\sigma_i(k_i-r_i)-N+1[N]}^{(i)} \end{bmatrix}$$

when the Fourier transformation corresponds to an inverse Fourier transform and when the conjugate chirp signal corresponds to the conjugation of the reference chirp signal; or $$\underline{Y'}^{(i)} = \frac{1}{N} S_{k_i - r_i[N]}^* \begin{bmatrix} e^{-2j\pi \frac{r_i(\sigma_i(k_i-r_i)-0)}{N}} e^{2j\pi \frac{(k_i-r_i)\cdot 0}{N}} Y_{\sigma_i(k_i-r_i)-0[N]}^{(i)*} \\ e^{-2j\pi \frac{r_i(\sigma_i(k_i-r_i)-1)}{N}} e^{2j\pi \frac{(k_i-r_i)\cdot 1}{N}} Y_{\sigma_i(k_i-r_i)-1[N]}^{(i)*} \\ \vdots \\ e^{-2j\pi \frac{r_i(\sigma_i(k_i-r_i)-N+1)}{N}} e^{2j\pi \frac{(k_i-r_i)\cdot(N-1)}{N}} Y_{\sigma_i(k_i-r_i)-N+1[N]}^{(i)*} \end{bmatrix}$$

when the Fourier transform corresponds to a forward Fourier transform and when the conjugate chirp signal corresponds to the conjugation of said received signal; or $$\underline{Y'}^{(i)} = S_{k_i - r_i[N]}^* \begin{bmatrix} e^{+2j\pi \frac{r_i(0-\sigma_i(k_i-r_i))}{N}} e^{2j\pi \frac{(k_i-r_i)\cdot 0}{N}} Y_{0-\sigma_i(k_i-r_i)[N]}^{(i)*} \\ e^{+2j\pi \frac{r_i(1-\sigma_i(k_i-r_i))}{N}} e^{2j\pi \frac{(k_i-r_i)\cdot 1}{N}} Y_{1-\sigma_i(k_i-r_i)[N]}^{(i)*} \\ \vdots \\ e^{+2j\pi \frac{r_i(N-1-\sigma_i(k_i-r_i))}{N}} e^{2j\pi \frac{(k_i-r_i)\cdot(N-1)}{N}} Y_{N-1-\sigma_i(k_i-r_i)[N]}^{(i)*} \end{bmatrix}$$

when the Fourier transform corresponds to an inverse Fourier transform and when the conjugation chirp signal corresponds to the conjugation of said received signal;

with $$S_k = (-1)^k e^{j\pi\sigma \frac{k^2}{N}}$$

and with σ being a parameter belonging to {−1,1}.

Thus, the estimation of the parameters needed to take account of the transmission channel corresponds to the minimum square error between the sent symbol and the received symbol thereby reducing the errors of estimation on the received symbol.

Besides, in one variant, only N' channel coefficients are taken into account among the N possible coefficients, thereby simplifying the processing operations embedded in the receiver.

According to one embodiment, the step for estimating channel coefficients comprises the following sub-steps:
computing parameters representing the channel coefficient $H_0$ and another of the channel coefficients;
obtaining parameters representing the remaining channel coefficients from the computed parameters.

Thus, the chirp waveform as well as the choice of the value of Tc in effective systems such as the LoRa® system (8 μs), which remains high relative to the maximum temporal dispersion of the channel, lead in fact to a situation where only two parameters remain to be estimated (e.g. $H_0$ and another term $H_I$ with I non-null) for determining the set of terms $H_I$, thus leading to great simplicity in carrying out the step for estimating parameters representing the impact of the transmission channel and therefore of the receiver, ultimately.

According to one embodiment, the channel coefficient of non-null index I is inversely proportional to sine $$\frac{\pi I}{N}.$$

Thus, the chirp waveform and the choice of the value of Tc in effective systems such as the LoRa® system, which remains high relative to the maximum temporal dispersion of the channel, also lead to an exponential decrease in the amplitude of the terms $H_I$ as a function of I. This shows that it is possible to envisage using only a restricted quantity of the terms $H_I$ to model the effect of the channel, e.g. the terms corresponding to an index I smaller than or equal to 10, thereby reducing the computational complexity of the optimal receiver in terms of maximum likelihood.

According to one embodiment, the pre-determined symbol is a symbol of a learning sequence or a received symbol, the rank k̂ of which has been decided during a previous execution of said symbol estimation step.

Thus, the estimating of the parameters needed to take account of the transmission channel can be done on the basis of known symbols, e.g. learning or synchronizing sequences thereby enabling a robust estimation of these parameters, or on the basis of preliminarily received data symbols, thereby making it possible to refine this estimation during reception.

The invention also relates to a computer program, comprising program code instructions to implement a method for demodulating a received signal, the received signal resulting from the modulation of a basic chirp signal as described here above, according to any one of its different embodiments, when said program is executed by a processor.

Another embodiment of the invention proposes a device for demodulating a received signal, the received signal resulting from the modulation of a basic chirp signal as described here above.

Such a demodulation device comprises a reprogrammable computation machine or a dedicated computation machine capable of being configured to:
determine N decision components from the received signal and a reference chirp signal obtained by modulating the basic chirp signal by a reference symbol corresponding to a symbol of rank r in the constellation,
a decision component of index I, denoted as a component $D_I$, being a function of a term of which the phase depends quadratically on I, with I being an integer from 0 to N−1;
deciding the rank k̂ of the symbol carried by the received signal from the decision component, of index k, denoted as a component $D_k$, having an extremum value among the N decision components.

Such a demodulation device is especially capable of implementing the method for demodulating a received signal resulting from the modulation of a basic chirp signal according to the invention (according to any one of its different embodiments mentioned here above).

Thus, the characteristics and advantages of this device are the same as those of the method of demodulation described here above. They are therefore not described in more ample detail.

4 LIST OF FIGURES

Other features and advantages of the invention shall appear from the following description, given by way of an indicatory and non-exhaustive example and from the appended drawings of which:

Figure 7A:
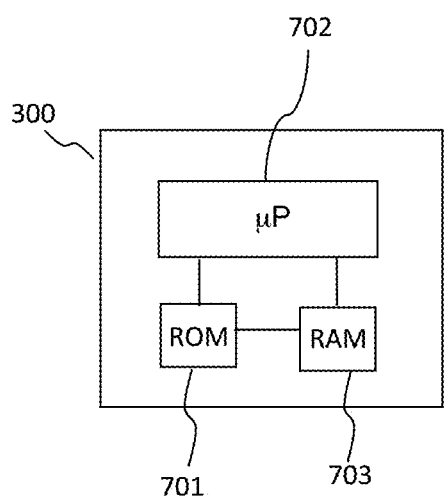
Figure 7B:
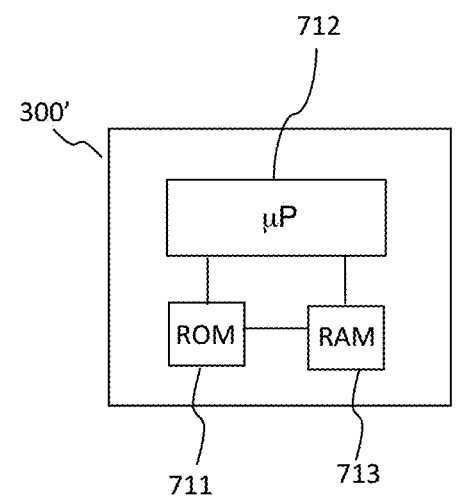

FIGS. 7a and 7b present examples of structures of the demodulation device according to different embodiments of the invention.

5 DETAILED DESCRIPTION OF THE INVENTION

In all the figures of the present document, the identical elements and steps are designated by a same reference.

The general principle of the invention relies on the estimation of a symbol of a received signal, corresponding to a modulated chirp signal transmitted in a transmission channel, from N decision components representing the symbols, in a constellation of N symbols.

To this end, the I-th component among the N decision components is a function of I via a complex term, the argument of which varies quadratically as a function of I.

The index k̂ representing the received symbol in the constellation of N symbols is then determined as a function of the index k of the decision component which shows an extremum value among the N decision components.

The proposed solution makes it possible especially to demodulate a signal generated by using the technique described in the above-mentioned patent EP 2 449 690 B1.

Figure 1:
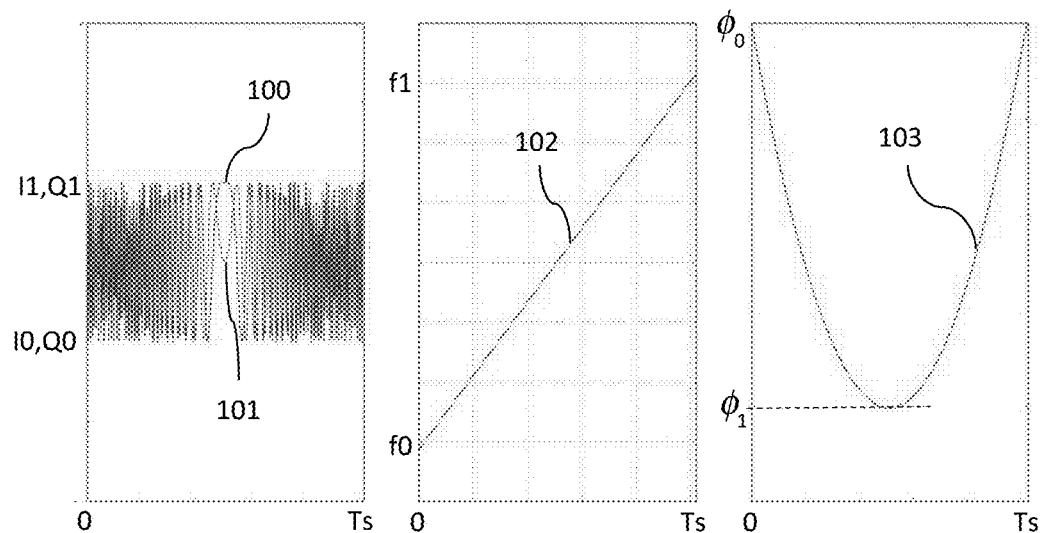
FIG. 1 illustrates the characteristics of a non-modulated chirp signal used in LoRa® technology.

As already indicated, this patent EP 2 449 690 B1 describes a technique of information transmission based on the modulation of a basic chirp signal. As shown in FIG. 1, the instantaneous frequency 102 of the basic chirp signal varies linearly between a first instantaneous frequency f0 and a second instantaneous frequency f1 for the duration Ts of a symbol. Such an instantaneous frequency herein represents the rotation speed in the complex plane of the vector, the coordinates of which are given by the in-phase signal 100 and the in-quadrature signal 101 so as to transpose the basic chirp signal on to the carrier frequencies and thus generate a radiofrequency signal.

Since the chirp signal is a constant envelope signal, the in-phase signal 100 and the in-quadrature signal 101 respectively oscillate between two extremal values, respectively I0 and I1 and Q0 and Q1, its frequency varying linearly in time as does the instantaneous frequency 102 of the resulting basic chirp signal. Owing to the linear variation of the instantaneous frequency 102, the basic chirp signal thus defined has an instantaneous phase 103 that varies quadratically between two values $\phi_0$ and $\phi_1$ for the duration Ts, the instantaneous frequency being the derivative of the instantaneous phase.

Figure 2:
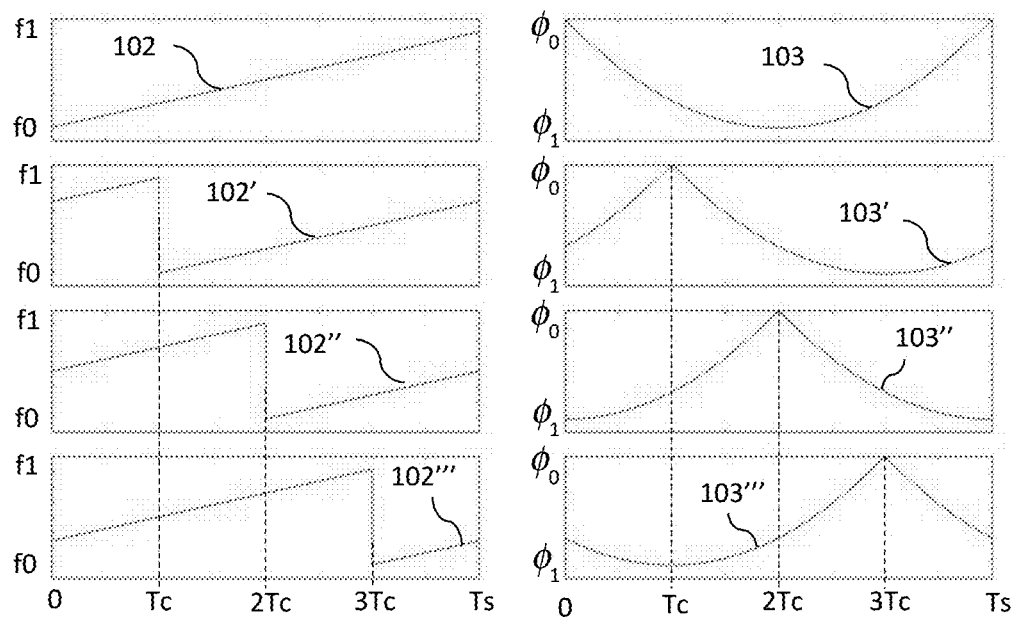
FIG. 2 illustrates the instantaneous frequencies and instantaneous phases of different chirp signals modulated according to the LoRa® technology.

The modulated chirp signals are then obtained by circular permutation of the pattern of variation of the instantaneous frequency of the basic chirp signal over a duration Ts, obtained following a time shift of k times an elementary time duration, called a "chip" duration Tc. The index k then represents the rank of a symbol in a constellation of Ns symbols and we then have Ns*Tc=Ts. By way of an illustration, FIG. 2 represents the instantaneous frequency 102, 102', 102'', 102''' and the instantaneous phase 103, 103', 103'', 103''' of different modulated chirp signals corresponding respectively to k=0, k=1, k=2 and k=3, i.e. enabling the transmission of the information on the basis of a constellation of four symbols. The basic chirp signal, corresponding to k=0, is then interpreted in this case as carrying the symbol of rank zero in the constellation.

The inventors have noted that, according to this technology, determining the value of a received symbol received via such a signal, i.e. determining its rank k in the constellation of N symbols, is equivalent to determining the index k that has served as a basis for computing the time shift used to generate the instantaneous phase pattern and instantaneous frequency pattern of the modulated chirp signal in question.

It can be seen indeed that the basic chirp signal can be expressed in the time domain and over the duration of a symbol period, i.e. fort from 0 to Ts as $$s(t) = e^{j\phi(t)}$$

where $$\phi(t) = 2\pi\left(f_0 + \frac{f_1 - f_0}{2T_s}\right)t + \phi_0$$

with $\phi_0$ being the initial value of the phase.

In practice, the LoRa® signal is such that the bandwidth of the chirp signal, i.e. |f₁−f₀|, is adjusted inversely to the chip duration Tc and f1 is chosen such that $f_1=-f_0$. It being known that Ts=Ns*Tc, the expression of the instantaneous phase of the chirp signal can then be rewritten as $$\phi(t) = \frac{2\pi}{T_c}\sigma\left(\frac{t}{2NT_c} - \frac{1}{2}\right)t + \phi_0$$

with σ being a parameter belonging to {−1,1} making it possible to model both the rising chirp signals (i.e. with a rising instantaneous frequency) and the descending chirp signals (i.e. those with a decreasing instantaneous frequency).

The analytical expression, $s_k(t)$, of a chirp signal modulated by a symbol of rank k in the constellation of N symbols (k therefore ranging from 0 to N−1) and therefore corresponding to a circular permutation of the pattern of the basic chirp signal as described here above, can be then expressed as $$s_k(t) = s(t - kT_c[T_s]) = e^{j\phi(t - kT_c[T_s])} \quad \text{(Eq-1)}$$

where [·] designates the modulo function.

This equation can then be reformulated as follows, for t ranging from 0 to Ts=N*Tc:

$$s_k(t) = e^{2j\pi\sigma\frac{N}{2}\bar{\phi}\left(\frac{1}{N}\left(\frac{t}{T_c} - k\right)\right)} \quad \text{(Eq-2a)}$$

with:

$$\bar{\phi}(u) = (u-1)u \text{ for } u \in [0, 1] \quad \text{(Eq-2b)}$$

$$\bar{\phi}(u) = (u+1)u \text{ for } u \in [-1, 0] \quad \text{(Eq-2c)}$$

Figure 3A:
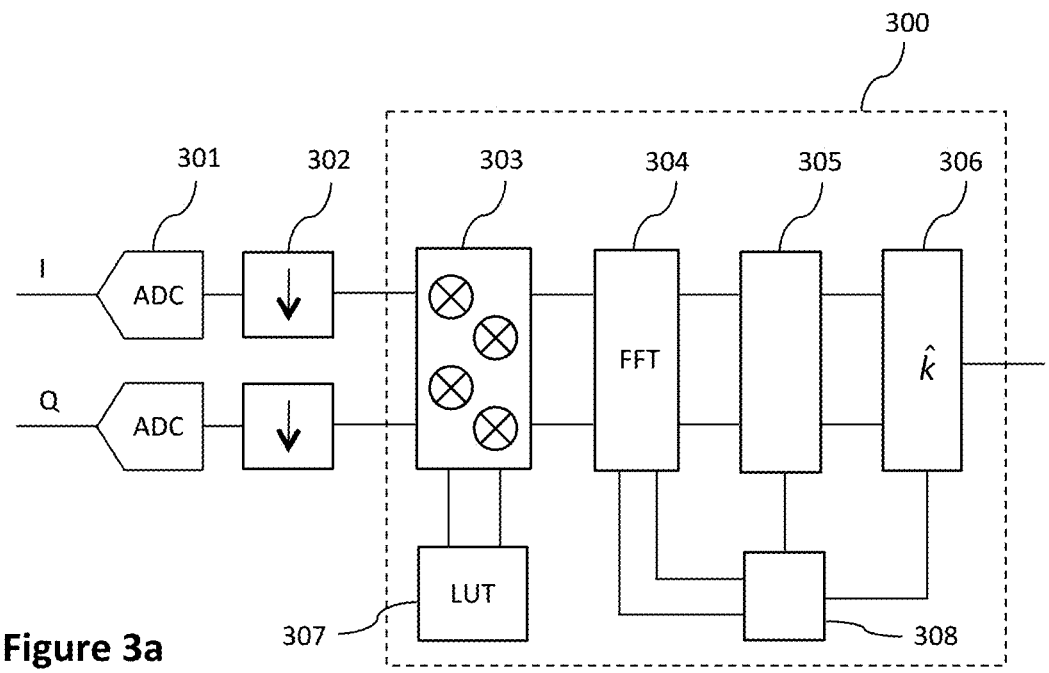
FIGS. 3a and 3b illustrate reception structures according to different embodiments of the invention.
Figure 3B:
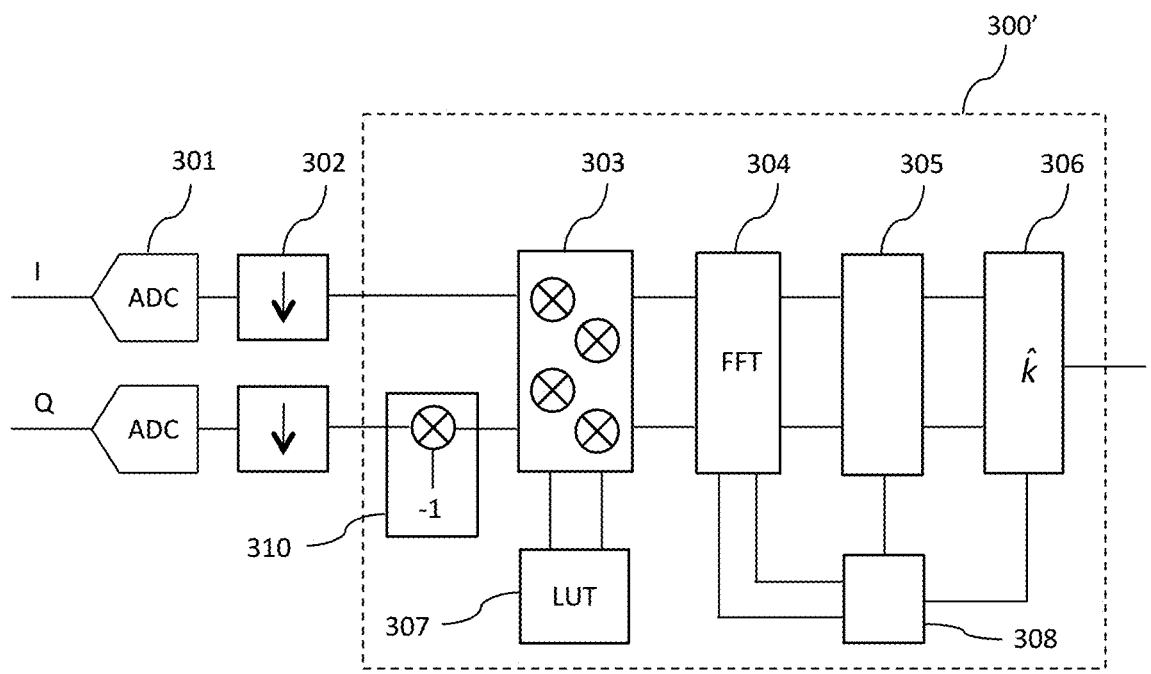

Referring now to FIGS. 3a and 3b, we describe two reception structures that make it possible to estimate a symbol carried by a received signal, corresponding to a basic chirp signal modulated according to the technique described here above, i.e. making it possible to decide on the index k used to generate the pattern of variation of the instantaneous frequency and instantaneous phase of this signal, according to different embodiments of the invention.

More particularly, these figures illustrate the structures used to carry out processing operations on the in-phase I signals and in-quadrature Q signals, representing the modulating signal obtained after radiofrequency or RF demodulation of the radiofrequency signal received (here below in this patent application, the term 'RF demodulation' designates the transposition into baseband of the received signal, this transposition delivering analog I and Q signals representing the signal modulating the received RF carrier and the term 'demodulation' designates the processing operations carried out on the I and Q signals, often after sampling and quantification, leading to the determining of the information contained in the modulating signal). During this RF demodulation, it is always possible to choose a carrier frequency so that $f_1=-f_0$.

In practice, such I and Q signals are obtained via the use of an RF receiver known to those skilled in the art (for example a direct conversion receiver, a superheterodyne receiver or any equivalent architecture), implementing an in-quadrature RF demodulator and delivering two analog I and Q channels.

The I and Q signals are then sampled by an analog-digital converter or ADC 301 (for example a flash converter or a converter based on a sigma-delta modulator, or a device of the SAR (successive approximation register) type or any other equivalent) present on the corresponding reception channel. In one classic reception chain, with such a converter working at a sampling frequency that is often high relative to the bandwidth of the payload signal, the signal delivered by the ADC is decimated by a decimation stage 302 (for example a CIC (cascaded integrator-comb) type of linear phase filter or any other equivalent) present on each of the I and Q paths so that each one delivers N samples that can be interpreted as the real and imaginary parts of N complex samples.

The N complex samples are then delivered to a demodulation device 300, 300' comprising different modules.

According to the embodiment illustrated in FIG. 3a, the N complex samples are directly delivered to a complex multiplier 303. The complex multiplier 303 then carries out a term-by-term multiplication of the N complex samples with N complex samples representing a conjugate reference chirp signal delivered by a generation module 307, in this case a look-up table or LUT storing the corresponding pre-computed samples.

Such a conjugate chirp signal is herein defined as a chirp signal, the instantaneous frequency of which varies inversely to that of the chirp signal in question. For example, if we reconsider the case of a basic chirp signal as described here above with reference to FIG. 1, i.e. a signal of which the instantaneous frequency varies linearly from f0 to f1 over a duration Ts, the conjugate basic chirp signal then show an instantaneous frequency that varies linearly from f1 to f0 over the same duration Ts. Thus the multiplication of a chirp signal by its conjugate sound cancels out the linear variation of its instantaneous frequency. The result then has a constant instantaneous frequency.

In another embodiment illustrated in FIG. 3b, the sign of the imaginary part of the N complex samples corresponding to the received signal is inverted by an inversion module 310. Thus, the inversion module 310 delivers signals corresponding to the base band signals I and Q representing the conjugate chirp signal of the effectively received chirp signal.

The N complex samples thus obtained are then delivered to the complex multiplier 303 which multiplies them term-by-term with N complex samples representing the reference chirp signal delivered by the generating module 307.

The N complex samples delivered by the complex multiplier 303 are therefore, in this second embodiment, the conjugate complex values of those obtained in the embodiment described here above with reference to FIG. 3a.

The N complex samples delivered by the complex multiplier 303 are then delivered to a discrete Fourier transform module 304.

In one embodiment, the discrete Fourier transform implemented is a forward discrete Fourier transform. In another embodiment of the invention, the discrete Fourier transform implemented is an inverse discrete Fourier transform.

Thus, four embodiments appear here:
  in a first embodiment, the conjugation is applied to the reference chirp signal (the case of FIG. 3a), and the discrete Fourier transform implemented is a forward discrete Fourier transform;
  in a second embodiment, the conjugation is applied to the reference chirp signal (the case of FIG. 3a) and the discrete Fourier transform implemented is an inverse discrete Fourier transform;
  in a third embodiment, the conjugation is applied to the received chirp signal (the case of FIG. 3b) and the discrete Fourier transform implemented is a forward discrete Fourier transform;
  in a fourth embodiment, the conjugation is applied to the received chirp signal (the case of FIG. 3b), and the discrete Fourier transform implemented is an inverse discrete Fourier transform.

In variants, N is expressed as power of 2 and the discrete Fourier transform in question is implemented as a fast Fourier transform.

The N transformed complex samples delivered by the discrete Fourier transform module 304 are then given to a generating module 305 for generating N decision components representing the rank k, in the constellation of N symbols, of the symbol carried by the received signal.

The N components are then delivered to a decision module 306 which decides the rank k of the received symbol as a function of the index of the component that has an extremum value among the N components.

In one variant, the N components representing the rank k of the symbol modulating the basic chirp signal take account of the effect of the propagation channel. A channel estimator 308 then estimates the channel coefficients on the basis of samples provided by the discrete Fourier transform module 304 and of the rank of the corresponding received symbol decided by the decision module 306.

Figure 4:
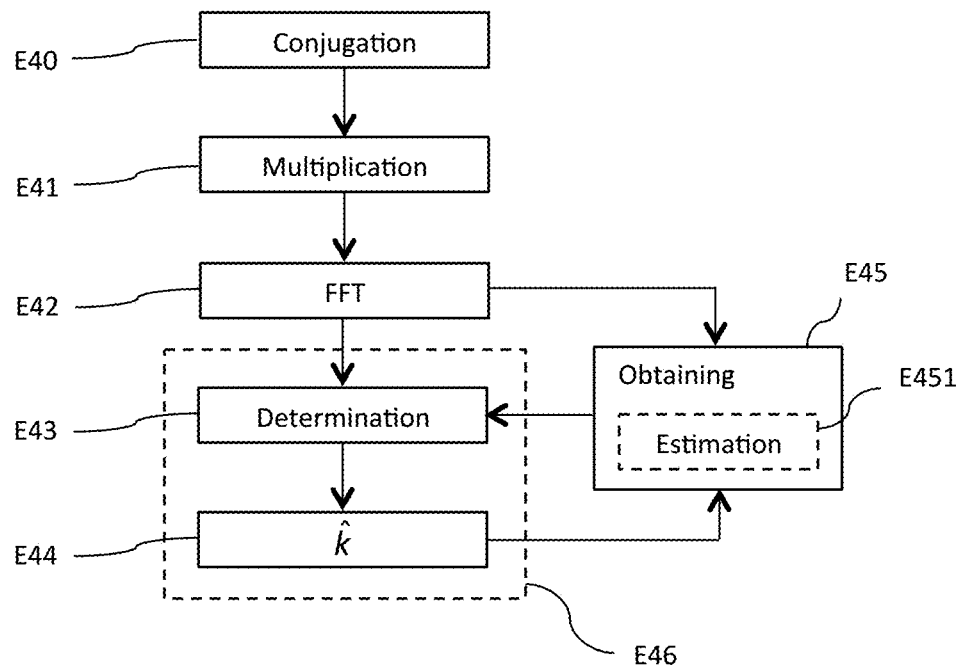
FIG. 4 illustrates steps of a method of demodulation according to different embodiments of the invention.

Referring to FIG. 4, a description is now provided of a method for demodulating a received signal, making it possible especially to estimate a symbol carried by the received signal according to different embodiments of the invention.

At a step E40, a conjugate chirp signal is obtained. As described here above, with reference to FIGS. 3a and 3b, this conjugate chirp signal can correspond either to the signal resulting from the conjugation of the base band signal $s_r(t)$ representing the reference chirp of a duration Ts delivered by the generation module 307 (first and second embodiments mentioned here above), or to the signal resulting from the conjugation of the baseband signal y(t) representing the chirp signal received (third and fourth embodiments mentioned here above), also having a duration Ts.

In general, the reference chirp signal corresponds to a basic chirp signal modulated by a reference symbol of rank r in the constellation of symbols. In one variant, r is taken as being equal to 0 when the reference chirp signal is the basic chirp signal.

At a step E41, the complex multiplier 303 delivers the signal multiplied by the discrete Fourier transform module 304.

In the first and second embodiments mentioned here above, this multiplied signal is thus expressed as $y(t)s_r^*(t)$, and in the third and fourth embodiments mentioned here above, this multiplied signal is thus expressed as $y^*(t)s_r(t)$, i.e. as the conjugate complex of this signal delivered by the complex multiplier 303 in the first and second embodiments.

An analytical expression of the product $y(t)s_r^*(t)$ is first of all derived here below.

In general, the chirp signal received has been propagated via a radioelectrical propagation channel, the impulse response h(t) of which can be expressed classically as a sum of P paths offset in time, each path possibly being modeled by a complex amplitude $A_p$ and a real lag $\tau_p$ so that $$h(t) = \sum_{p=0}^{P-1} A_p \delta(t-\tau_p) \quad \text{(Eq-3)}$$

with δ(t) being the Dirac distribution.

Besides, the received signal is also stained with additive noise w(t) assumed to be Gaussian and centered so that it can be written in general that:

$$y(t) = (h * s_k)(t) + w(t)$$

with $t \in [0, T_s + \tau_{max}]$ and $\tau_{max} = \tau_{P-1}$, the support of the impulse response h(t) being $[0, \tau_{max}]$.

Once the receiver is synchronized in time, it is then possible to write, assuming that the received signal corresponds to a basic chirp signal modulated by a symbol of rank k in the constellation of symbols, that $$y(t) = \int_0^{+\infty} h(\tau) s_k(t - \tau) d\tau + w(t) = \sum_{p=0}^{P-1} A_p s_k(t - \tau_p) + w(t)$$

Thus, at the output from the complex multiplier 303 and in the first and second embodiments mentioned here above, it can be seen that:

$$y(t) s_r^*(t) = \left( \int_0^\infty h(\tau) s_k(t - \tau) d\tau \right) s_r^*(t) + w(t) s_r^*(t)$$

At a step E42, a Fourier transform is applied by the discrete Fourier transform module 304 in order to deliver a transformed signal.

In order to simplify the writing, the subsequent part of the computation is presented for the particular case where the reference symbol corresponds to the basic chirp signal, i.e. for r=0, when even the results will be given for the general case.

Taking $$u = \frac{t}{T_s} \text{ et } u_0 = \frac{k}{N} +$$

and in defining $\in$ as $$\epsilon = \begin{cases} 0 \text{ if } (u - u_0) \in [0, 1] \\ 1 \text{ if } (u - u_0) \in [-1, 0[ \end{cases}$$

We can then use the expression of $s_k(t)$ given by (Eq-2a) to express $s_k(t-\tau)s^*(t)$ as:

$$s_k(t - \tau) s^*(t) = e^{2j\pi \frac{N\sigma}{2} [\bar{\phi}(u - u_0) - \bar{\phi}(u)]} = e^{2j\pi \frac{N\sigma}{2} [(u - u_0 + \epsilon)(u - u_0 + \epsilon - 1) - (u - 1)u]} =$$
$$e^{2j\pi \frac{N\sigma}{2} [-2uu_0 + 2\epsilon u + u_0^2 - 2\epsilon u_0 + u_0 + \epsilon^2 - \epsilon]} = e^{j\pi N\sigma(u_0^2 + u_0)} e^{2j\pi N\sigma((\epsilon - u_0)u - \epsilon u_0)}$$

By application of a forward discrete Fourier transform (DFT) on the sample signal $u_{kn}(\tau) = s_k(nT_c - \tau) s^*(nT_c)$, it appears that:

$$DFT(\{u_{kn}(\tau)\}_{n=0,\ldots,N-1})_l =$$
$$U_{kl}(\tau) = (-1)^k e^{j\sigma \frac{\pi}{N}\left(k + \frac{\tau}{T_c}\right)^2} e^{j\pi\sigma\frac{\tau}{T_c}} \left[ \sum_{n=0}^{N-1} e^{2j\pi N\sigma(\epsilon - u_0)\frac{n}{N} - \epsilon u_0} e^{-2j\pi \frac{ln}{N}} \right]$$

In taking q to denote the term $$e^{-2j\frac{\pi}{N}\left(\sigma\left(k + \frac{\tau}{T_c}\right) + l\right)},$$

it appears that:

$$\sum_{n=0}^{N-1} e^{2j\pi N\sigma(\epsilon - u_0)\frac{n}{N} - \epsilon u_0} e^{-2j\pi \frac{ln}{N}} =$$
$$e^{-2j\sigma\pi\frac{\tau}{T_c}} \left( \sum_{n=0}^{k} e^{-2j\pi\left(\sigma\left(k + \frac{\tau}{T_c}\right) + l\right)\frac{n}{N}} \right) + \left( \sum_{n=k+1}^{N-1} e^{-2j\pi\left(\sigma\left(k + \frac{\tau}{T_c}\right) + l\right)\frac{n}{N}} \right) =$$
$$e^{-2j\pi\sigma\frac{\tau}{T_c}} \left( \sum_{n=0}^{k} q^n \right) + \left( \sum_{n=k+1}^{N-1} q^n \right) =$$
$$\frac{e^{-2j\pi\sigma\frac{\tau}{T_c}}(1 - q^{k+1}) + q^{k+1}(1 - q^{N-k-1})}{1 - q} = q^{k+1} \frac{\left(1 - e^{-2j\pi\sigma\frac{\tau}{T_c}}\right)}{(1 - q)}$$

Thus $$= N(-1)^k e^{j\sigma\frac{\pi}{N}\left(k + \frac{\tau}{T_c}\right)^2} e^{-\frac{2j\pi}{N}\left(\sigma\left(k + \frac{\tau}{T_c}\right) + l\right)\left(k + \frac{1}{2}\right)} \frac{\text{sine}\left(\pi\sigma\frac{\tau}{T_c}\right)}{N \text{ sine}\left[\frac{\pi}{N}\left(\sigma\left(k + \frac{\tau}{T_c}\right) + l\right)\right]}$$

This equation can be reformulated so as to show the terms that depend on the propagation channel and those linked to the waveform used. Thus:

$$U_{kl}(\tau) = N e^{-2j\pi \frac{k(\sigma k + 1)}{N}} (-1)^{\sigma k + l} e^{-j\frac{\pi(\sigma k + l)}{N}} \times$$
$$\frac{\text{sine}\left(\pi\left(\sigma k + l + \sigma\frac{\tau}{T_c}\right)\right)}{N \text{ sine}\left[\frac{\pi}{N}\left(\sigma k + l + \sigma\frac{\tau}{T_c}\right)\right]} e^{j\frac{\pi}{N}\sigma\left(\left(\frac{\tau}{T_c}\right)^2 - \frac{\tau}{T_c}\right)} (-1)^k e^{j\pi\sigma\frac{k^2}{N}}$$

It is then possible finally to express the samples of the transformed signal as:

$$DFT(\{y(nT_c)s^*(nT_c)\})(l) = Y_l = \sum_{p=0}^{P-1} A_p U_{kl}(\tau_p) + DFT(\{w(nT_c)s^*(nT_c)\})$$

or in another form:

$$Y_l = N e^{-2j\pi \frac{k(\sigma k + l)}{N}} H_{\sigma k + l[N]} S_k + W_l$$

with l and k from 0 to N−1 and $$H_l = (-1)^l e^{-j\pi\frac{l}{N}} \sum_{p=0}^{P-1} A_p e^{j\frac{\pi}{N}\sigma\left(\left(\frac{\tau_p}{T_c}\right)^2 - \frac{\tau_p}{T_c}\right)} \phi_N\left(\sigma\frac{\tau_p}{T_c} + l\right) \quad \text{(Eq-4a)}$$

$$\phi_N(x) = \frac{\text{sine}(\pi x)}{N \text{ sine}\left(\frac{\pi x}{N}\right)} \quad \text{(Eq-4b)}$$

$$S_k = (-1)^k e^{j\pi\sigma\frac{k^2}{N}} \quad \text{(Eq-4c)}$$

$$W_l = DFT\{w(nT_c)s^*(nT_c)\} \quad \text{(Eq-4d)}$$

In the general case where the reference chirp signal corresponds to a basic chirp signal modulated by a reference symbol of rank r in the constellation of symbols, the computation gives, for the N samples of the transformed signal $Y_l$ obtained at output from the Fourier transform module 304:

in the first embodiment mentioned here above (corresponding to the application of a forward Fourier transform to $y(nT_c)s_r^*(nT_c)$ and to $w(nT_c)s_r^*(nT_c)$):

$$Y_l = Ne^{-2j\pi \frac{rl}{N}} e^{-2j\pi \frac{(k-r)(\sigma(k-r)+l)}{N}} H_{\sigma(k-r)-l[N]} S_{k-r[N]} + W_l \quad \text{(Eq-5a)}$$

in the second embodiment mentioned here above (corresponding to the application of an inverse Fourier transform to $y(nT_c)s_r^*(nT_c)$ and to $w(nT_c)s_r^*(nT_c)$):

$$Y_l = e^{+2j\pi \frac{rl}{N}} e^{-2j\pi \frac{(k-r)(\sigma(k-r)-l)}{N}} H_{\sigma(k-r)-l[N]} S_{k-r[N]} + W_l \quad \text{(Eq-5b)}$$

in the third embodiment mentioned here above (corresponding to the application of a forward Fourier transform to $y^*(nT_c)s_r(nT_c)$ and to $w^*(nT_c)s_r(nT_c)$):

$$Y_l = Ne^{-2j\pi \frac{rl}{N}} e^{+2j\pi \frac{(k-r)(\sigma(k-r)-l)}{N}} H^*_{\sigma(k-r)-l[N]} S^*_{k-r[N]} + W_l \quad \text{(Eq-5c)}$$

in the fourth embodiment mentioned here above (corresponding to the application of an inverse Fourier transform to $y^*(nT_c)s_r(nT_c)$ and to $w^*(nT_c)s_r(nT_c)$):

$$Y_l = e^{+2j\pi \frac{rl}{N}} e^{+2j\pi \frac{(k-r)(\sigma(k-r)+l)}{N}} H^*_{\sigma(k-r)+l[N]} S^*_{k-r[N]} + W_l \quad \text{(Eq-5d)}$$

Besides, in order to simplify the reading, the same notations $Y_l$, $H_l$ and $W_l$ are used to designate the corresponding samples obtained at output of the Fourier transform module 304 whatever the above-mentioned embodiment considered.

At a step E43, N decision components $D_l$, l being an integer ranging from 0 to N−1, capable of being interpreted as representing the N components of a decision vector ($D_0$, $D_1$, ..., $D_{N-1}$), and representing the rank of the symbol carried by the received signal are determined by a generation module 305.

To this end, it is proposed in one embodiment to apply a maximum likelihood criterion to the N samples $Y_l$ delivered by the discrete Fourier transform module 304. Indeed, the Gaussian assumption for the additive noise $w(nT_c)$ remains true for the samples $W_l$ obtained at output from the discrete Fourier transform module 304, the Fourier transformation of a Gaussian distribution giving another Gaussian distribution.

If we reconsider for example the first embodiment mentioned here above (corresponding to the application of a forward Fourier transform to $y(nT_c)s_r^*(nT_c)$), and if we reconsider the particular case where the reference symbol corresponds to the basic chirp signal, i.e. for r=0, for a greater clarity in the writing, the samples $W_l$ can be expressed as follows on the basis of the equation (Eq-5a):

$$W_l = Y_l - Ne^{-2j\pi \frac{k(\sigma k + l)}{N}} H_{\sigma k + l[N]} S_k$$

Thus, applying a criterion of maximum likelihood, the rank of the symbol modulating the basic chirp signal and corresponding to the received signal corresponds to the index k, which maximizes the density of probability of the symbol observed at reception or, in terms of a Gaussian density, it corresponds to the index k minimizing the argument of the Gaussian function. i.e. the quantity $$\sum_{n=0}^{N-1} \left| Y_n - Ne^{-2j\pi \frac{k(\sigma k + n)}{N}} H_{\sigma k + n[N]} S_k \right|^2$$

In an equivalent way, after development of the modulus squared and the change of variable from n to N−n, it can be seen that the rank of the symbol corresponding to the received signal can be expressed as a function of the index k maximizing the quantity $$\Re\left( \sum_{n=1}^{N} Y^*_{N-n} e^{-2j\pi\sigma \frac{k(\sigma k - n)}{N}} H_{\sigma k - n[N]} S_k \right)$$

where $\Re(\cdot)$ designates the real part. In an equivalent way, the conjugate complex of the argument of the real part here above could be taken.

In other words, N decision components $D_l$, with l ranging from 0 to N−1, enabling the estimation of the rank of the symbol carried by the signal received, can be determined on the basis of this expression taken for the different possible assumptions of rank of symbol (i.e. the N assumptions correspond to k ranging from 0 to N−1 in the expression here above). Each of the N decision components $D_l$ correspond then to the quantity here above taken for the assumption of corresponding symbol rank, and the estimated value k̂ of the rank of the symbol carried by the received signal is then expressed as a function of the decision component, of index k, denoted as the component $D_l$ thus determined.

In the general case, where the reference chirp signal corresponds to a basic chirp signal modulated by a reference symbol of rank r in the constellation of symbols, an equivalent computation enables the definition of the N decision components $D_l$ obtained at output of the generation module 305, the decision component of index k, $D_k$, being expressed as follows:

in the above-mentioned first embodiment (corresponding to the application of a forward Fourier transform to $y(nT_c)s_r^*(nT_c)$ and to $w(nT_c)s_r^*(nT_c)$):

$$D_k = \Re\left( \sum_{n=1}^{N} Y^*_{N-n} e^{2j\pi \frac{rn}{N}} e^{-2j\pi \frac{k(\sigma k - n)}{N}} H_{\sigma k - n[N]} S_k \right) \quad \text{(Eq-6a)}$$

in the above-mentioned second embodiment (corresponding to the application of an inverse Fourier transform to $y(nT_c)s_r^*(nT_c)$ and to $w(nT_c)s_r^*(nT_c)$):

$$D_k = \Re\left( \sum_{n=1}^{N-1} Y^*_n e^{2j\pi \frac{rn}{N}} e^{-2j\pi \frac{k(\sigma k - n)}{N}} H_{\sigma k - n[N]} S_k \right) \quad \text{(Eq-6b)}$$

in the above-mentioned third embodiment (corresponding to the application of a forward Fourier transform to y*(nT$_c$)s$_r$(nT$_c$) and to w*(nT$_c$)s$_r$(nT$_c$)):

$$D_k = \Re\left(\sum_{n=1}^{N-1} Y_n^* e^{-2j\pi \frac{m}{N}} e^{2j\pi \frac{k(\sigma k-n)}{N}} H_{\sigma k-n[N]}^* S_k^*\right) \quad \text{(Eq-6c)}$$

in the above-mentioned fourth embodiment (corresponding to the application of an inverse Fourier transform to y*(nT$_c$)s$_r$(nT$_c$) and to w*(nT$_c$)s$_r$(nT$_c$)):

$$D_k = \Re\left(\sum_{n=1}^{N} Y_{N-n}^* e^{-2j\pi \frac{m}{N}} e^{2j\pi \frac{k(\sigma k-n)}{N}} H_{\sigma k-n[N]}^* S_k^*\right) \quad \text{(Eq-6d)}$$

As discussed here above, in variants, it is the conjugate complex of the argument of the real part defining D$_k$ that is taken in the equations (Eq-6a) to (Eq-6d).

In one variant, the radioelectrical propagation channel is reduced to a single path (e.g. in the case of a point-to-point link in direct view). In this case, the impulse response given by the equation (Eq-3) is reduced to a single amplitude term A$_0$. Similarly, assuming a perfect synchronization of the receiver, we have τ$_0$=0. It appears then, on the basis of the equations (Eq-4a) and (Eq-4b), that all the terms H$_l$ are null for I ranging from 1 to N−1, and that only H$_0$ is non-null.

Thus, in this particular case where the propagation channel is reduced to an AWGN (additive white Gaussian noise) channel, the N decision components D$_l$ obtained at output of the generation module 305 and given in the general case by the equations (Eq-6a) to (Eq-6d) are simplified and the decision component of index k, D$_k$, is expressed as:

in the above-mentioned first embodiment (corresponding to the application of a forward Fourier transform to y(nT$_c$)s$_r$*(nT$_c$) and to w(nT$_c$)s$_r$*(nT$_c$)):

$$D_k = \Re\left(Y_{N-\sigma k[N]}^* e^{2j\pi\sigma \frac{rk}{N}} H_0 S_k\right) \quad \text{(Eq-7a)}$$

in the above-mentioned second embodiment (corresponding to the application of an inverse Fourier transform to y(nT$_c$)s$_r$*(nT$_c$) and to w(nT$_c$)s$_r$*(nT$_c$)):

$$D_k = \Re\left(Y_{\sigma k[N]}^* e^{2j\pi\sigma \frac{rk}{N}} H_0 S_k\right) \quad \text{(Eq-7b)}$$

in the above-mentioned third embodiment (corresponding to the application of a forward Fourier transform to y*(nT$_c$)s$_r$(nT$_c$) and to w*(nT$_c$)s$_r$(nT$_c$)):

$$D_k = \Re\left(Y_{\sigma k[N]}^* e^{-2j\pi\sigma \frac{rk}{N}} H_0^* S_k^*\right) \quad \text{(Eq-7c)}$$

in the above-mentioned fourth embodiment (corresponding to the application of an inverse Fourier transform to y*(nT$_c$)s$_r$(nT$_c$) and to w*(nT$_c$)s$_r$(nT$_c$)):

$$D_k = \Re\left(Y_{N-\sigma k[N]}^* e^{-2j\pi\sigma \frac{rk}{N}} H_0^* S_k^*\right) \quad \text{(Eq-7d)}$$

As discussed here above, in variants, it is the conjugate complex of the argument of the real part defining D$_k$ that is taken in the equations (Eq-7a) to (Eq-7d).

It is thus seen in the equations (Eq-7a) to (Eq-7d) that the optimal receiver in the AWGN channel in terms of maximum likelihood applied to the samples taken at output of the forward or inverse Fourier transform bringing into play a term S$_k$ (the expression of which is given by the equation (Eq-4c)), the phase of which varies quadratically as a function of the index of the sample considered in the decision components D$_k$ enabling the estimation of the received symbol.

This quadratic equation is directly related to the square variation of the instantaneous phase of the received signal. Taking into account the particular law of variation of this instantaneous phase thus makes it possible to implement the optimal receiver in terms of maximum likelihood for an analytical cost comparable to that related to the prior art receiver which bases the decision solely on the modulus of the samples at output of the Fourier transform as described in the patent document EP 2 449 690 B1.

It can be seen also in this case that the only coefficient related to the propagation channel present in the equations (Eq-7a) to (Eq-7d), i.e. the coefficient H$_0$, is reduced to a standardization constant independent of the index k. However, it is seen that the phase of this term H$_0$ (phase related to the time of propagation undergone by the received signal since its transmission) is summed with the phase of other terms dependent on k in the argument of the real part function appearing on the equations (Eq-7a) to (Eq-7d). Thus, although independent of k, the term H$_0$ nevertheless has an impact on the index k corresponding to the decision component D$_k$ presenting an extremum value among the value N decision components.

Besides, if we reconsider the equations (Eq-6a) to (Eq-6d), it is now seen for a channel having multiple paths that the coupling terms of D$_k$ weighting the samples Y$_n$, for n different from k, are proportional to a channel coefficient H$_{\sigma k-n[N]}$ depending solely on the difference between the indices of the signal samples considered at output of the forward or inverse Fourier transform. Indeed, the invariance in time of the impulse response of the channel leads to terms representing inter-symbol interference depending solely on the difference between the indices of the considered samples of the signal.

However, the square variation of the phase of the received signal dictates a situation where the coupling between the samples is not invariant in time for a given difference between sample indices considered. More particularly, the term S$_k$, the phase of which varies quadratically as a function of the index of the sample considered, and which is intrinsically linked to the very structure of the waveform used, is herein also present.

Thus, taking account of these two effects in the very structure of the N decision components used to estimate the received symbol enables implementing a receiver in terms of maximum likelihood in the presence of a propagation channel having multiple paths while making it possible to work in the frequency domain, i.e. in working on the samples at output of the forward or inverse Fourier transform.

At a step E44, an estimated value k̂ of the rank k of the symbol carried by the received signal is decided on the basis of the index of the decision component $D_k$ which presents an extremum value among the N components determined during the step E43. More particularly, the estimated value $\hat{k}$ corresponds to $$\hat{k} = r + \arg\max_k\{D_k\} \quad [N]$$

The combination of the steps E43 and E44 then make it possible to implement a step E46 for estimating the received symbol.

It can be seen, in the light of the expressions of the decision components $D_k$ given by the equations (Eq-6a) to (Eq-6d) or (Eq-7a) to (Eq-7d) that, in certain embodiments, the channel coefficients $H_l$, l ranging from 0 to N−1, must be known for the implementation of the decision step E44.

In one embodiment, the channel coefficients $H_l$ are initialized at a default value, e.g. $H_0$ is set at 1 and the channel coefficients $H_l$, l ranging from 1 to N−1, are set at 0 to enable the initializing of the reception. Thus, the reception of first symbols can take place and obtaining channel coefficients $H_l$, l ranging from 0 to N−1, can then be achieved as described here below in relation with the step E45, for a subsequent implementation of the decision step E44.

At a step E45, the N channel coefficients $H_l$, l ranging from 0 to N−1, are thus obtained.

In one embodiment, the characteristics of the propagation channel are known (e.g. in a static configuration) and the N channel coefficients obtained then correspond to N pre-determined channel coefficients which can be directly loaded at initialization into the decision module 306.

In another embodiment, the characteristics of the propagation channel are unknown in advance (e.g. in the event of mobility of the receiver and/or of the transmitter) and the N channel coefficients obtained correspond to N channel coefficients $\hat{H}_l$ estimated during a sub-step E451.

More particularly, the method described bases this estimation on the samples delivered by the discrete Fourier transform 304 during a preliminary implementation of the steps E40 to E42 as well as the rank of at least one corresponding pre-determined symbol.

In one variant, the pre-determined symbols in question are symbols of a learning sequence (e.g. a preamble or a learning sequence of a radio frame) thereby enabling a robust estimation of the channel coefficients. In the case of a LoRa® transmission, it is then a plurality of basic chirp signals, i.e. signals corresponding to a symbol of rank 0 in the constellation, with a positive or negative slope (i.e. the value of σ varies between +1 and −1 from one chirp to another).

In another variant, the pre-determined symbols in question are data symbols, the rank of which has been preliminarily determined during the execution of a preceding step E44, thereby making it possible to refine the estimation of the channel coefficients during reception.

In one embodiment, this estimation is carried out on a single received symbol in order to simplify this step of estimation and reduce the overall consumption of the connected thing embedding the described technique.

In another embodiment, this estimation is performed on the basis of a plurality of received symbols, thereby making it possible to average the estimation in order to reduce its variance.

In general, if we consider Ns symbols to estimate the N channel coefficients $H_l$, l ranging from 0 to N−1, $k_i$ denotes the rank of the i-th of these Ns symbols in the constellation of N symbols, and $r_i$ denotes the rank of the reference symbol used at reception of this i-th symbol, the equations (Eq-5a) to (Eq-5d) give us the expression of the N samples of the transformed signal $Y_l'^{(i)}$, with l ranging from 0 to N−1, obtained at output of the Fourier transform module 304 in the four embodiments mentioned here above at the reception of this i-th symbol.

By algebraic manipulation, it is possible to isolate the N channel coefficients $H_l$ in these equations. Thus, adopting a vector notation for greater clarity and letting $\underline{H}$ denote the vector, the components of which are the N coefficients of the channel $H_l$, it can be written, from the equations (Eq-5a) to (Eq-5d), that $$\underline{Y}'^{(i)} = \underline{H} + \underline{W}'^{(i)} \quad \text{(Eq-8)}$$

with $$\underline{H} = \begin{bmatrix} H_0 \\ H_1 \\ \vdots \\ H_{N-1} \end{bmatrix}$$

and with the components of the vector $\underline{Y}'^{(i)}$ given by:

In the first above-mentioned embodiment (corresponding to the application of a forward Fourier transform to $y(nT_c)s_r^*(nT_c)$ and to $w(nT_c)s^*(nT_c)$) by:

$$\underline{Y}'^{(i)} = \quad \text{(Eq-9a)}$$

$$\frac{1}{N} S^*_{k_i-r_i[N]} \begin{bmatrix} e^{+2j\pi \frac{r_i(0-\sigma_i(k_i-r_i))}{N}} e^{2j\pi \frac{(k_i-r_i)\cdot 0}{N}} Y^{(i)}_{0-\sigma_i(k_i-r_i)[N]} \\ e^{+2j\pi \frac{r_i(1-\sigma_i(k_i-r_i))}{N}} e^{2j\pi \frac{(k_i-r_i)\cdot 1}{N}} Y^{(i)}_{1-\sigma_i(k_i-r_i)[N]} \\ \vdots \\ e^{+2j\pi \frac{r_i(N-1-\sigma_i(k_i-r_i))}{N}} e^{2j\pi \frac{(k_i-r_i)\cdot(N-1)}{N}} Y^{(i)}_{N-1-\sigma_i(k_i-r_i)[N]} \end{bmatrix}$$

In the second above-mentioned embodiment (corresponding to the application of an inverse Fourier transform to $y(nT_c)s_r^*(nT_c)$ and to $w(nT_c)s_r^*(nT_c)$) by:

$$\underline{Y}'^{(i)} = \quad \text{(Eq-9b)}$$

$$S^*_{k_i-r_i[N]} \begin{bmatrix} e^{-2j\pi \frac{r_i(\sigma_i(k_i-r_i)-0)}{N}} e^{2j\pi \frac{(k_i-r_i)\cdot 0}{N}} Y^{(i)}_{\sigma_i(k_i-r_i)-0[N]} \\ e^{-2j\pi \frac{r_i(\sigma_i(k_i-r_i)-1)}{N}} e^{2j\pi \frac{(k_i-r_i)\cdot 1}{N}} Y^{(i)}_{\sigma_i(k_i-r_i)-1[N]} \\ \vdots \\ e^{-2j\pi \frac{r_i(\sigma_i(k_i-r_i)-N+1)}{N}} e^{2j\pi \frac{(k_i-r_i)\cdot(N-1)}{N}} Y^{(i)}_{\sigma_i(k_i-r_i)-N+1[N]} \end{bmatrix}$$

In the third above-mentioned embodiment (corresponding to the application of a forward Fourier transform to $y^*(nT_c)s_r(nT_c)$ and to $w^*(nT_c)s_r(nT_c)$) by:

$$\underline{Y}'^{(i)} = \quad \text{(Eq-9c)}$$

$$\frac{1}{N} S^*_{k_i-r_i[N]} \begin{bmatrix} e^{-2j\pi \frac{r_i(\sigma_i(k_i-r_i)-0)}{N}} e^{2j\pi \frac{(k_i-r_i)\cdot 0}{N}} Y^{(i)*}_{\sigma_i(k_i-r_i)-0[N]} \\ e^{-2j\pi \frac{r_i(\sigma_i(k_i-r_i)-1)}{N}} e^{2j\pi \frac{(k_i-r_i)\cdot 1}{N}} Y^{(i)*}_{\sigma_i(k_i-r_i)-1[N]} \\ \vdots \\ e^{-2j\pi \frac{r_i(\sigma_i(k_i-r_i)-N+1)}{N}} e^{2j\pi \frac{(k_i-r_i)\cdot(N-1)}{N}} Y^{(i)*}_{\sigma_i(k_i-r_i)-N+1[N]} \end{bmatrix}$$

In the fourth above-mentioned embodiment (corresponding to the application of an inverse Fourier transform to $y^*(nT_c)s_r(nT_c)$ and to $w^*(nT_c)s_r(nT_c)$) by:

$$\underline{Y}'^{(i)} = \quad \text{(Eq-9d)}$$

$$S^*_{k_i-r_i[N]} \begin{bmatrix} e^{+2j\pi\frac{r_i(0-\sigma_i(k_i-r_i))}{N}} e^{2j\pi\frac{(k_i-r_i)\cdot 0}{N}} Y^{(i)*}_{0-\sigma_i(k_i-r_i)[N]} \\ e^{+2j\pi\frac{r_i(1-\sigma_i(k_i-r_i))}{N}} e^{2j\pi\frac{(k_i-r_i)\cdot 1}{N}} Y^{(i)*}_{1-\sigma_i(k_i-r_i)[N]} \\ e^{+2j\pi\frac{r_i(N-1-\sigma_i(k_i-r_i))}{N}} e^{2j\pi\frac{(k_i-r_i)\cdot(N-1)}{N}} Y^{(i)*}_{N-1-\sigma_i(k_i-r_i)[N]} \end{bmatrix}$$

and with $\underline{W}'^{(i)}$ being a vector, the l-th components of which is proportional to the sample $W_l$ obtained at output of the Fourier transform module 304 during the reception of the i-th symbol used for the estimation of the channel. It can thus be seen that the vector $\underline{W}'^{(i)}$ is a white and centered Gaussian vector.

The vector $\underline{H}$ can then be estimated on the basis of a maximum likelihood criterion. The density of probability of the vector $\underline{W}'^{(i)}$ being Gaussian, the estimated vector $$\underline{\hat{H}} = \begin{bmatrix} \hat{H}_0 \\ \hat{H}_1 \\ \vdots \\ \hat{H}_{N-1} \end{bmatrix}$$

of H maximizing the density of probability of the symbol observed at reception, it being known that a symbol of rank k has been sent, corresponds to the vector $\underline{\hat{H}}$ minimizing the argument of the Gaussian function, i.e. the quantity $$\sum_{i=0}^{N_s-1} \|\underline{Y}'^{(i)} - \underline{\hat{H}}\|^2$$

where $\|\cdot\|$ designates the Hermitian norm.

After development of the square of this norm, it can be seen that $\underline{\hat{H}}$ is expressed as the mean on the Ns symbols considered of the vectors $\underline{Y}'^{(i)}$, i.e.

$$\underline{\hat{H}} = \frac{1}{N_s}\sum_{i=0}^{N_s-1} \underline{Y}'^{(i)} \quad \text{(Eq-9e)}$$

the vector $\underline{Y}'^{(i)}$ given by the equations (Eq-9a) to (Eq-9d) following the above-mentioned embodiment considered.

Figure 5:
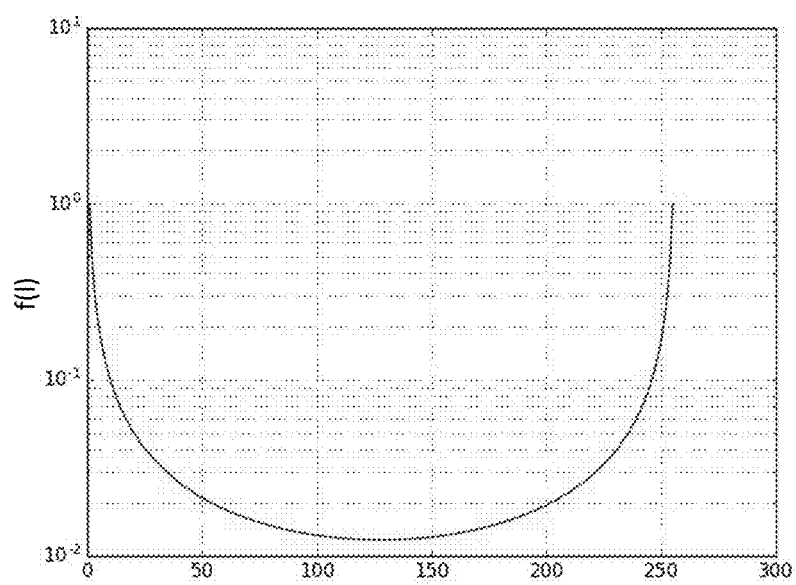
FIG. 5 illustrates the decrease in coupling terms between samples according to different embodiments of the invention.

Referring now to FIG. 5, we describe a simplification in the estimation of the channel parameters according to one embodiment of the invention.

More particularly, if we reconsider the equations (Eq-4a) and (Eq-4b), it is seen that the variations of the arguments of the function $\phi_N(\cdot)$, i.e.

$$\sigma\frac{\tau_p}{T_c} + l,$$

remain low around l as an integer. Indeed, in the LoRa® technology, $T_c$ chosen to be equal 8 µs, a value that is low as compared with the dispersion observed in most known radioelectrical propagation channels (i.e. as compared with the differences between the lag $\tau_p$, p non-null, associated with each path beyond the lag of the main path, which is often the direct path, and the lag of this main path). For example, the propagation channel models in urban environments given in the standardization document 3GPP TS 45.005 V8.8.0: 3rd Generation Partnership Project; Technical Specification Group GSM/EDGE Radio Access Network; Radio transmission and reception, published by ETSI in April 2010 give the differences between lags i.e. corresponding to $\tau_p - \tau_0$, below 5 µs.

This means that, assuming a prefect synchronization of the receiver, which amounts to considering $\tau_0 = 0$ in the previous equations, a limited development of $\phi_N(\cdot)$ about the values of its integer multiple argument leads to the ability to express the channel coefficients for $l \neq 0$ as $$H_l \approx I_0 \frac{\pi}{N \sin\!c\frac{\pi l}{N}} e^{-j\pi\frac{l}{N}} \quad \text{(Eq-10)}$$

with $I_0$ being a parameter expressed as a function of the parameters of the propagation channel as $$I_0 = \sum_{p=0}^{P-1} A_p \sigma \frac{\tau_p}{T_c} e^{j\frac{\pi}{N}\sigma\left(\left(\frac{\tau_p}{T_c}\right)^2 - \frac{\tau_p}{T_c}\right)}$$

It is thus seen that a set of parameters $H_l$, with l ranging from 0 to N−1, can be determined on the basis of only two parameters, thus drastically simplifying the channel estimating step.

In one variant, the two parameters in question are $H_0$ and another of the $H_l$ values with l different from zero. Indeed, the equation (Eq-10) shows us that the parameters $H_l$ with l different from zero can be deduced from one of them. In this variant, the parameter $H_0$ and the parameter $H_l$ considered can be estimated from the equations (Eq-9e) and (Eq-9a) to (Eq-9d) following the above-mentioned embodiment considered. Indeed, these parameters $H_0$ and $H_l$ are respectively the first and the l-th component of the vector $\underline{H}$ defined here above and can thus be estimated according to the technology described for estimating this vector.

In another variant, the two parameters in question are $H_0$ and the parameter introduced into the equation (Eq-10). The parameter $I_0$ can thus be alternatively estimated by injecting the equation (Eq-10) into the equation (Eq-8), leading to $$\underline{Y}'^{(i)} = \underline{H} + \underline{W}'^{(i)} = I_0 \underline{C} + \underline{W}'^{(i)}$$

with $$\underline{C} = \begin{bmatrix} \frac{\pi}{N\sin\!c\frac{\pi\cdot 1}{N}} e^{-j\pi\frac{1}{N}} \\ \frac{\pi}{N\sin\!c\frac{\pi\cdot 2}{N}} e^{-j\pi\frac{2}{N}} \\ \vdots \\ \frac{\pi}{N\sin\!c\frac{\pi(N-1)}{N}} e^{-j\pi\frac{N-1}{N}} \end{bmatrix}$$

If we then return to a criterion of maximum likelihood applied to this equation to determine the parameter $I_0$, a computation similar to the one described here above with reference to the obtaining of the equation (Eq-9e) gives $$\hat{I}_0 = \frac{1}{\|\underline{C}\|^2} \mathfrak{R}\left(\underline{C}^{*T} \frac{\sum_{i=0}^{N_s-1} \underline{Y}'^{(i)}}{N_s}\right)$$

with the vector $\underline{Y}'^{(i)}$ given by one of the equations (Eq-9a) to (Eq-9d) following the above-mentioned embodiment considered, with $\underline{C}^{*T}$ being the transposed vector of the vector $\underline{C}^*$, itself being obtained by conjugating each component of $\underline{C}$. $\hat{I}_0$ in this formula represents the estimation of $I_0$.

In the embodiment where the channel estimation is performed on a single received symbol, the equations here above remain valid in considering Ns=1.

Besides, in the variant where the set of the parameters $H_l$, with I ranging from 0 to N–1, is determined on the basis of the two parameters $H_0$ and $I_0$, the expressions of the N decision components $D_l$ obtained at output of the generation module 305 and enabling the estimation symbol sent, given in the general case by the equations (Eq-6a) to (Eq-6d), are simplified on the basis of the equation (Eq-10), and the decision component of index k, $D_k$, being expressed as:

In the first above-mentioned embodiment (corresponding to the application of a forward Fourier transform to $y(nT_c)s_r^*(nT_c)$ and to $w(nT_c)s_r^*(nT_c)$):

$$D_k = \qquad \text{(Eq-11a)}$$
$$\mathfrak{R}\left(S_k H_0 \left[Y^*_{N-\sigma k[N]} e^{2j\pi\sigma \frac{rk}{N}} + \frac{I_0}{H_0} \sum_{\substack{n=1 \\ n\neq \sigma k[N]}}^{N} Y^*_{N-n} \frac{\pi}{N\sin\frac{\pi}{N}(\sigma k - n)}\right. \right.$$
$$\left.\left. e^{2j\pi \frac{m}{N}} e^{-j\pi \frac{(2k+1)(\sigma k - n)}{N}}\right]\right)$$

In the second above-mentioned embodiment (corresponding to the application of an inverse Fourier transform to $y(nT_c)s_r^*(nT_c)$ and to $w(nT_c)s_r^*(nT_c)$):

$$D_k = \mathfrak{R}\left(S_k H_0 \left[Y^*_{\sigma k[N]} e^{2j\pi\sigma \frac{rk}{N}} + \frac{I_0}{H_0} \right.\right. \qquad \text{(Eq-11b)}$$
$$\left.\left. \sum_{\substack{n=0 \\ n\neq \sigma k[N]}}^{N-1} Y^*_N \frac{\pi}{N\sin\frac{\pi}{N}(\sigma k - n)} e^{2j\pi \frac{m}{N}} e^{-j\pi \frac{(2k+1)(\sigma k - n)}{N}}\right]\right)$$

In the third above-mentioned embodiment (corresponding to the application of a forward Fourier transform to $y^*(nT_c)s_r(nT_c)$ and to $w^*(nT_c)s_r(nT_c)$):

$$D_k = \mathfrak{R}\left(S_k^* H_0^* \left[Y^*_{\sigma k[N]} e^{-2j\pi\sigma \frac{rk}{N}} + \frac{I_0}{H_0^*}\right.\right. \qquad \text{(Eq-11c)}$$

$$\left.\left. \sum_{\substack{n=0 \\ n\neq \sigma k[N]}}^{N-1} Y^*_N \frac{\pi}{N\sin\frac{\pi}{N}(\sigma k - n)} e^{-2j\pi \frac{m}{N}} e^{j\pi \frac{(2k+1)(\sigma k - n)}{N}}\right]\right)$$

In the fourth above-mentioned embodiment (corresponding to the application of an inverse Fourier transform to $y^*(nT_c)s_r(nT_c)$ and to $w^*(nT_c)s_r(nT_c)$):

$$D_k = \mathfrak{R} \qquad \text{(Eq-11d)}$$
$$\left(S_k^* H_0^* \left[Y^*_{N-\sigma k[N]} e^{-2j\pi\sigma \frac{rk}{N}} + \frac{I_0}{H_0^*} \sum_{\substack{n=1 \\ n\neq \sigma k[N]}}^{N} Y^*_{N-n} \frac{\pi}{N\sin\frac{\pi}{N}(\sigma k - n)}\right.\right.$$
$$\left.\left. e^{-2j\pi \frac{m}{N}} e^{j\pi \frac{(2k+1)(\sigma k - n)}{N}}\right]\right)$$

As indicated here above, in variants, it is the conjugate complex of the argument of the real part defining $D_k$ that is taken in the equations (Eq-11a) to (Eq-11d).

Besides, it can be seen in the light of the equation (Eq-10) (and therefore of the equations (Eq-11a) to (Eq-11d) derived from this equation (Eq-10)) that the approximation of the function $\phi_N(\cdot)$ (approximation permitted by the choice of a value of the chip duration $T_c$ that is high as compared with the lag differences associated with each path beyond the main lag, e.g. as in the LoRa® technology) in the expression of the channel coefficients $H_l$, for I as a non-null integer, shows a variation of the amplitude of these terms $H_l$ as the function $$f(l) = \frac{\pi}{N\sin\frac{\pi}{N}}$$

represented in FIG. 5. There thus appears an exponential decrease of the amplitude of the coefficients $H_l$ as a function of the index I, the amplitude of the coefficient $H_{10}$ being divided by 10 relative to that of $H_1$.

As a consequence, the effect of the channel can be correctly modeled in taking account only of a restricted number of parameters $H_l$, for example the N' first channel coefficients of index I, with I ranging from 0 to N'–1, thereby simplifying the processing operations embedded in the receiver for the decision of the received symbols in the presence of propagation channel showing multi-paths.

In one variant, the N' channel coefficients (N'≤N) are obtained by application of the general method described here above with reference to the equations (Eq-8) and (Eq-9a) to (Eq-9e) applied to the vector $$\underline{H} = \begin{bmatrix} H_0 \\ H_1 \\ \vdots \\ H_{N'-1} \end{bmatrix}.$$

The vectors $\underline{Y}'^{(i)}$ to be considered for the implementing of this method, following the embodiment among the four above-mentioned embodiments considered, are those given by the equations (Eq-9a) to (Eq-9d), but restricted to their N' first terms.

In another variant, the N' channel coefficients considered are determined from only two parameters as described here above with reference to the equations (Eq-10) and the following equations (e.g. $H_0$ and another of the $H_I$ values with I different from zero, or else $H_0$ and $I_0$). Here again, the vectors considered must be restricted to the N' first terms.

In yet another variant, only N' channel coefficients are taken into account among the N possible coefficients, but it is not the N' first channel coefficients, i.e. the channel coefficients of index I lower than N'. In this case, the general method described here above with reference to the equations (Eq-8) and (Eq-9a) to (Eq-9e) can be applied but N−N' corresponding channel coefficients are pre-supposed to be null. The same applies when the N' channel coefficients considered are determined from only two parameters as described here above with reference to the equations (Eq-10) and the following equations. This simplifies the structure of the unit for estimating the symbol received when a characteristic of the propagation channel can be pre-supposed.

Figure 6:
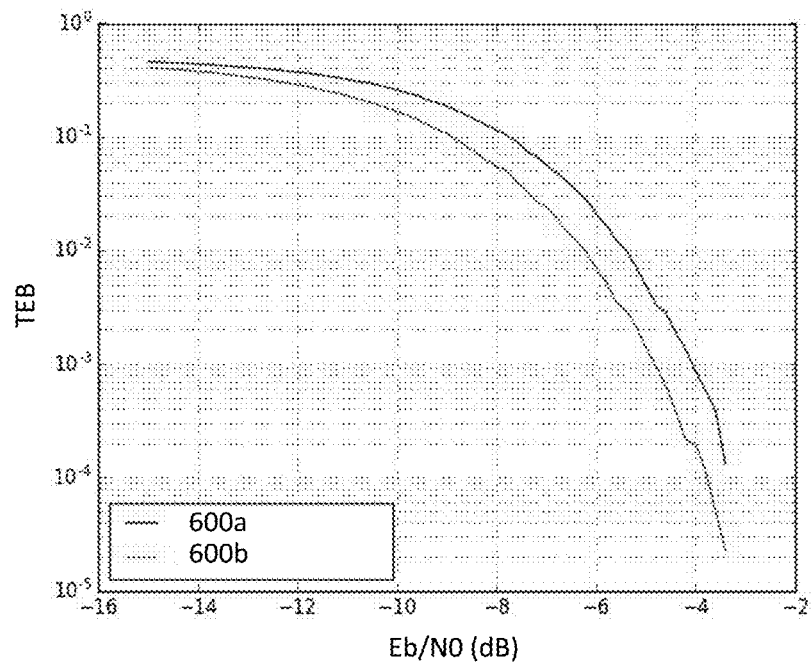
FIG. 6 illustrates performance values obtained in comparison with those obtained by the prior art technique in one particular embodiment of the invention.

Referring now to FIG. 6, we describe the performance obtained when the described technique is used in the case of an AWGN type propagation channel as compared with those obtained when the prior art technique is used.

In this situation, obtaining channel coefficients according to the technique described performed at the step E45 amounts to obtaining a single parameter $H_0$, the other terms $H_I$ being null for I ranging from 1 to N−1 as described here above with reference to FIG. 4. Besides, the decision of the rank of the symbols received at the step E44 is based in this case on the use of decision components $D_k$ that are given by the equation among the equations (Eq-7a) to (Eq-7d) corresponding to the above-mentioned embodiment considered, and are determined at the step E43.

According to the prior art technique described in the patent document EP 2 449 690 B1, the rank of the received symbol is determined solely on the basis of a sample at output of the Fourier transform presenting the maximum amplitude independently of any phase information.

It can be seen that the use of the technique described (curve 600b), provides a gain of the order of 1 decibel in the Eb/N0 ratio (i.e. the ratio of energy per bit received relative to the spectral noise density) necessary to obtain a binary error rate, or BER, given relative to the known technique (curve 600a).

For a given BER value, such a gain on the Eb/N0 ratio is expressed directly on the signal-to-noise ratio required at input to the receiver. This results in a corresponding gain on the range of the general system and therefore on the coverage of the cells of the network considered. In practice, one decibel of gain on the signal-to-noise ratio at the input of the receiver corresponds to consequent increase of 12% in range.

The anticipated gains when the propagation channel shows fading phenomena are even greater, the described technique indeed making it possible to correct inter-symbol interference resulting from the multi-paths and therefore to improve the discrimination between the symbol sent and its adjacent symbols.

FIGS. 7a and 7b present examples of structures of device 300, 300' for the demodulation of the received symbols enabling the implementing of a method of demodulation described with reference to FIG. 4 according to different embodiments of the invention.

The demodulation device 300, 300' comprises a random-access memory 700, 713 (for example a RAM), a processing unit 702, 712 equipped for example with a processor and managed by a computer program stored in a read-only memory 701, 711 (for example a ROM or a hard-disk drive). At initialization, the code instructions of the computer program are for example loaded into the random-access memory 703, 713 and then executed by the processor of the processing unit 702, 712.

These FIGS. 7a and 7b illustrate only one particular way, among several possible ways, of making the device 300, 300' so that it carries out certain steps of the method described in detail here above with reference to FIG. 4 (in any one of its different embodiments). Indeed, these steps can be carried out equally well on a reprogrammable computing machine (a PC, a DSP or a microcontroller) executing a program comprising a sequence of instructions or on a dedicated computing machine (for example a set of logic gates such as an FPGA or an ASIC or any other hardware module.

Should the demodulation device 300, 300' be made with a programmable computing machine, the corresponding program (i.e. the sequence of instructions) could be stored in a detachable storage medium (such as for example a floppy disk, a CD-ROM or a DVD-ROM) or non-detachable storage medium, this storage medium being partially or totally readable by a computer or a processor.

The invention claimed is:

1. A method for demodulating a received signal by a demodulating device, said received signal resulting from modulation of a basic chirp signal, the instantaneous frequency of which varies linearly between a first instantaneous frequency f0 and a second instantaneous frequency f1 for a symbol time Ts, said modulation corresponding, for a symbol of rank s of a constellation of N symbols, s being an integer from 0 to N−1, to a circular permutation of the pattern of variation of said instantaneous frequency on said symbol time Ts, obtained by a time shift of s times an elementary time duration Tc, such that N*Tc=Ts, and from transmission of the modulated chirp signal in a transmission channel, wherein the method comprises an act of estimating a symbol carried by said received signal, implementing the following sub-acts, performed by the demodulating device for N samples of said received signal and for N samples of a reference chirp signal obtained by modulating said basic chirp signal by a reference symbol corresponding to a symbol of rank r in said constellation, taken at the same multiple instants of Tc:

conjugating said N samples of said reference chirp signal and outputting N samples of a conjugate reference chirp signal, or conjugating said N samples of said received signal and outputting N samples of a conjugate received signal;

multiplying, term by term, said N samples of said conjugate reference chirp signal by said N samples of said received signal and outputting N samples of a first multiplied signal, multiplying, term by term, said N samples of said conjugate received signal by said N samples of said reference chirp signal and outputting N samples of a second multiplied signal;

performing forward or inverse Fourier transformation of said first or second multiplied signal, outputting N samples $Y_I$ of a transformed signal with I being an integer from 0 to N−1;

determining N decision components from said N samples $Y_l$ of the transformed signal,
wherein a decision component of index I, denoted as a component $D_I$, is a function of a term having a phase which depends quadratically on I;
deciding the rank k of the symbol carried by said received signal, from the decision component, of index k, denoted as a component $D_k$, having an extremum value among said N decision components,
said component $D_k$ furthermore being a function of a term proportional to an amplitude of the sample of said index k, $Y_k$, among said N samples $Y_l$ of said transformed signal, as well as of the phase of said sample $Y_k$.

2. The method according to claim 1, wherein said component $D_k$ is furthermore a function of a sub-set of N' samples among the N samples $Y_l$ of said transformed signal with n being different from σk, with N'≤N, and with σ being a parameter belonging to $\{-1,1\}$.

3. The method according to claim 2,
wherein the method comprises an act of obtaining N channel coefficients $H_{\sigma k-n[N]}$ with n being an integer from 0 to N−1,
and wherein a sample of index n of said sub-set of samples $Y_n$ is weighted by a coupling coefficient proportional to the channel coefficient $H_{\sigma k-n[N]}$, where [N] designates modulo N, said channel coefficient $H_{\sigma k-n[N]}$ depending on the difference between the indices σk and n, and to a term, the argument of said term depending quadratically on said index k,
and wherein said term proportional to an amplitude of the sample $Y_k$ is a channel coefficient $H_0$ independent of k.

4. The method according to claim 3, wherein said component $D_k$ is a function of a term proportional to:
the real part of the sum $$\sum_{n=1}^{N} Y_{N-n}^* e^{2j\pi \frac{m}{N}} e^{-2j\pi \frac{k(\sigma k-n)}{N}} H_{\sigma k-n[N]} S_k,$$

where * designates the complex conjugate function, or of the conjugate complex of said sum, when said sub-act of forward or inverse Fourier transformation is an act of forward Fourier transformation and when conjugating said reference chirp signal; or
the real part of the sum $$\sum_{n=1}^{N-1} Y_{N-n}^* e^{2j\pi \frac{m}{N}} e^{-2j\pi \frac{k(\sigma k-n)}{N}} H_{\sigma k-n[N]} S_k,$$

or of the conjugate complex of said sum when said sub-act of forward or inverse Fourier transformation is an act of inverse Fourier transformation and when conjugating said reference chirp signal; or
the real part of the sum $$\sum_{n=1}^{N-1} Y_n^* e^{-2j\pi \frac{m}{N}} e^{2j\pi \frac{k(\sigma k-n)}{N}} H_{\sigma k-n[N]}^* S_k^*,$$

or of the conjugate complex of said sum, when said sub-act of forward or inverse Fourier transformation is an act of forward Fourier transformation and when conjugating said received signal; or the real part of the sum $$\sum_{n=1}^{N-1} Y_{N-n}^* e^{-2j\pi \frac{m}{N}} e^{2j\pi \frac{k(\sigma k-n)}{N}} H_{\sigma k-n[N]}^* S_k^*,$$

or of the conjugate complex of said sum when said sub-act of forward or inverse Fourier transformation is an act of inverse Fourier transformation and when conjugating said received signal;
with $$S_k = (-1)^k e^{j\pi\sigma \frac{k^2}{N}}$$

and with σ being a parameter belonging to $\{-1,1\}$.

5. The method according to claim 4, wherein said channel coefficients $H_{\sigma k-n[N]}$ are null for n different from σk.

6. The method according to claim 3, wherein the act of obtaining furthermore comprises estimating said channel coefficients from said N samples $Y_l$ of said transformed signal and from at least one pre-determined symbol.

7. The method according to claim 6, said estimated channel coefficients forming a vector $$\hat{H} = \begin{bmatrix} \hat{H}_0 \\ \hat{H}_1 \\ \vdots \\ \hat{H}_{N-1} \end{bmatrix},$$

said estimating said coefficients being done on the basis of Ns received pre-determined symbols, $k_i$ designating the rank of the i-th of said Ns pre-determined symbols in the constellation of N symbols, $r_i$ designating the rank of a reference symbol used during the reception of said i-th pre-determined symbol, $Y_l^{(i)}$ designating N samples of said transformed signal obtained during the reception of said i-th pre-determined symbol
wherein said vector $\hat{H}$ is expressed as $$\hat{H} = \frac{1}{N_s} \sum_{i=0}^{N_s-1} \underline{Y}'^{(i)}$$

with $$\underline{Y}'^{(i)} = \frac{1}{N} S_{k_i-r_i[N]}^* \begin{bmatrix} e^{+2j\pi \frac{r_i(0-\sigma_i(k_i-r_i))}{N}} e^{2j\pi \frac{(k_i-r_i)\cdot 0}{N}} Y_{0-\sigma_i(k_i-r_i)[N]}^{(i)} \\ e^{+2j\pi \frac{r_i(1-\sigma_i(k_i-r_i))}{N}} e^{2j\pi \frac{(k_i-r_i)\cdot 1}{N}} Y_{1-\sigma_i(k_i-r_i)[N]}^{(i)} \\ \vdots \\ e^{+2j\pi \frac{r_i(N-1-\sigma_i(k_i-r_i))}{N}} e^{2j\pi \frac{(k_i-r_i)\cdot(N-1)}{N}} Y_{N-1-\sigma_i(k_i-r_i)[N]}^{(i)} \end{bmatrix}$$

when said sub-act of forward or inverse Fourier transformation corresponds to an act of forward Fourier transformation and when conjugating said reference chirp signal; or $$Y'^{(i)} = S^*_{k_i-r_i[N]} \begin{bmatrix} e^{-2j\pi \frac{r_i(\sigma_i(k_i-r_i)-0)}{N}} e^{2j\pi \frac{(k_i-r_i)\cdot 0}{N}} Y^{(i)}_{\sigma_i(k_i-r_i)-0[N]} \\ e^{-2j\pi \frac{r_i(\sigma_i(k_i-r_i)-1)}{N}} e^{2j\pi \frac{(k_i-r_i)\cdot 1}{N}} Y^{(i)}_{\sigma_i(k_i-r_i)-1[N]} \\ \vdots \\ e^{-2j\pi \frac{r_i(\sigma_i(k_i-r_i)-N+1)}{N}} e^{2j\pi \frac{(k_i-r_i)(N-1)}{N}} Y^{(i)}_{\sigma_i(k_i-r_i)-N+1[N]} \end{bmatrix}$$

when said sub-act of forward or inverse Fourier transformation corresponds to an act of inverse Fourier transformation and when conjugating said reference chirp signal; or $$Y'^{(i)} = \frac{1}{N} S^*_{k_i-r_i[N]} \begin{bmatrix} e^{-2j\pi \frac{r_i(\sigma_i(k_i-r_i)-0)}{N}} e^{2j\pi \frac{(k_i-r_i)\cdot 0}{N}} Y^{(i)*}_{\sigma_i(k_i-r_i)-0[N]} \\ e^{-2j\pi \frac{r_i(\sigma_i(k_i-r_i)-1)}{N}} e^{2j\pi \frac{(k_i-r_i)\cdot 1}{N}} Y^{(i)*}_{\sigma_i(k_i-r_i)-1[N]} \\ \vdots \\ e^{-2j\pi \frac{r_i(\sigma_i(k_i-r_i)-N+1)}{N}} e^{2j\pi \frac{(k_i-r_i)(N-1)}{N}} Y^{(i)*}_{\sigma_i(k_i-r_i)-N+1[N]} \end{bmatrix}$$

when said sub-act of forward or inverse Fourier transformation corresponds to an act of forward Fourier transformation and when conjugating said received signal; or $$Y'^{(i)} = S^*_{k_i-r_i[N]} \begin{bmatrix} e^{+2j\pi \frac{r_i(0-\sigma_i(k_i-r_i))}{N}} e^{2j\pi \frac{(k_i-r_i)\cdot 0}{N}} Y^{(i)*}_{0-\sigma_i(k_i-r_i)[N]} \\ e^{+2j\pi \frac{r_i(1-\sigma_i(k_i-r_i))}{N}} e^{2j\pi \frac{(k_i-r_i)\cdot 1}{N}} Y^{(i)*}_{1-\sigma_i(k_i-r_i)[N]} \\ \vdots \\ e^{+2j\pi \frac{r_i(N-1-\sigma_i(k_i-r_i))}{N}} e^{2j\pi \frac{(k_i-r_i)(N-1)}{N}} Y^{(i)*}_{N-1-\sigma_i(k_i-r_i)[N]} \end{bmatrix}$$

when said sub-act of forward or inverse Fourier transformation corresponds to an act of inverse Fourier transformation and when conjugating said received signal;
where [N] designates modulo N, with $$S_k = (-1)^k e^{j\pi\sigma \frac{k^2}{N}}$$

and with σ being a parameter belonging to {−1,1}.

8. The method according to claim 6,
wherein said estimating said channel coefficients comprises the following sub-acts:
computing parameters representing a channel coefficient $\hat{H}_0$ and another of said channel coefficients;
obtaining parameters representing a remaining of said channel coefficients from said computed parameters.

9. The method according to claim 3, wherein a channel coefficient $H_{\sigma k-n[N]}$ having an index σk-n[N], named I, with a non-null value, is inversely proportional to sine $$\frac{\pi I}{N}.$$

10. The method according to claim 6, wherein said pre-determined symbol is a symbol of a learning sequence or a received signal, having a rank $\hat{k}$ which has been decided during a previous execution of said act of estimating a symbol.

11. A non-transitory computer-readable medium comprising a computer program product stored thereon, comprising program code instructions for implementing a method of demodulating a received signal, when said program is executed on a processor of a demodulating device,
said received signal resulting from modulation of a basic chirp signal, the instantaneous frequency of which varies linearly between a first instantaneous frequency f0 and a second instantaneous frequency f1 for a symbol time Ts, said modulation corresponding, for a symbol of rank s of a constellation of N symbols, s being an integer from 0 to N−1, to a circular permutation of the pattern of variation of said instantaneous frequency on said symbol time Ts, obtained by a time shift of s times an elementary time duration Tc, such that N*Tc=Ts, and from transmission of the modulated chirp signal in a transmission channel,
wherein the method comprises estimating a symbol carried by said received signal, implementing the following sub-acts, performed by the demodulating device for N samples of said received signal and for N samples of a reference chirp signal obtained by modulating said basic chirp signal by a reference symbol corresponding to a symbol of rank r in said constellation, taken at the same multiple instants of Tc:
conjugating said N samples of said reference chirp signal and outputting N samples of a conjugate reference chirp signal, or conjugating said N samples of said received signal and outputting N samples of a conjugate received signal;
multiplying, term by term, said N samples of said conjugate reference signal by said N samples of said received signal and outputting N samples of a first multiplied signal, or multiplying, term by term, said N samples of said conjugate received signal by said N samples of said reference chirp signal and outputting N samples of a second multiplied signal;
performing forward or inverse Fourier transformation of said first or second multiplied signal, outputting N samples $Y_I$ of a transformed signal with I being an integer from 0 to N−1;
determining N decision components from said N samples $Y_I$ of the transformed signal,
wherein a decision component of index I, denoted as a component $D_I$, is a function of a term having a phase which depends quadratically on I;
deciding the rank $\hat{k}$ of the symbol carried by said received signal, from the decision component, of index k, denoted as a component $D_k$, having an extremum value among said N decision components,
said component $D_k$ furthermore being a function of a term proportional to an amplitude of the sample of said index k, $Y_k$, among said N samples $Y_I$ of said transformed signal, as well as of the phase of said sample $Y_k$.

12. A device for demodulating a received signal,
said received signal resulting from the modulation of a basic chirp signal said received signal resulting from the modulation of a basic chirp signal, an instantaneous frequency of which varies linearly between a first instantaneous frequency f0 and a second instantaneous frequency f1 for a symbol time Ts, said modulation corresponding, for a symbol of rank s of a constellation of N symbols, s being an integer from 0 to N−1, to a circular permutation of the pattern of variation of said instantaneous frequency on said symbol time Ts, obtained by a time shift of s times an elementary time duration Tc, such that N*Tc=Ts, and from transmission of the modulated chirp signal in a transmission channel, wherein the device comprises a reprogrammable computation machine or a dedicated computation machine, capable of and being configured to, for N samples of said received signal and for N samples of a reference chirp signal obtained by modulating said basic chirp signal by a reference symbol corresponding to a symbol of rank r in said constellation, taken at the same multiple instants of Tc:

conjugate N samples of said reference chirp signal to output N samples of a conjugate reference chirp signal, or conjugate said N samples of said received signal to output N samples of a conjugate received signal;

multiply, term by term, said N samples of said reference chirp signal by said N samples of said received signal to output N samples of a first multiplied signal, or multiply, term by term, said N samples of said conjugate received signal by said N samples of said reference chirp signal, to output N samples of a multiplied second signal;

execute a forward or inverse Fourier transformation of said multiplied first or second signal, to output N samples $Y_l$ of a transformed signal with I being an integer from 0 to N−1;

determine N decision components from said N samples $Y_l$ of the transformed signal, wherein a decision component of index I, denoted as a component $D_l$, is a function of a term having a phase which depends quadratically on I;

decide the rank $\hat{k}$ of the symbol carried by said received signal from the decision component, of index k, denoted as a component $D_k$, having an extremum value among said N decision components, said component $D_k$ furthermore being a function of a term proportional to an amplitude of the sample of said index k, $Y_k$, among said N samples $Y_l$ of said transformed signal, as well as of the phase of said sample $Y_k$.

* * * * *